US008755286B2

(12) United States Patent
Tamura et al.

(10) Patent No.: US 8,755,286 B2
(45) Date of Patent: Jun. 17, 2014

(54) WIRELESS COMMUNICATION APPARATUS, WIRELESS COMMUNICATION BASE STATION AND WIRELESS COMMUNICATION SYSTEM

(75) Inventors: Takashi Tamura, Kanagawa (JP); Takahisa Aoyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 189 days.

(21) Appl. No.: 13/496,571

(22) PCT Filed: Sep. 17, 2010

(86) PCT No.: PCT/JP2010/005703
§ 371 (c)(1),
(2), (4) Date: Mar. 16, 2012

(87) PCT Pub. No.: WO2011/039969
PCT Pub. Date: Apr. 7, 2011

(65) Prior Publication Data
US 2012/0182879 A1    Jul. 19, 2012

(30) Foreign Application Priority Data

Sep. 29, 2009  (JP) ................................. 2009-224655
Jan. 8, 2010   (JP) ................................. 2010-003333

(51) Int. Cl.
*H04B 7/208*    (2006.01)

(52) U.S. Cl.
USPC ........................................................ 370/242

(58) Field of Classification Search
USPC .................................................. 370/235, 242
See application file for complete search history.

(56) References Cited

U.S. PATENT DOCUMENTS

| 8,526,322 B2* | 9/2013 | Jung et al. ...................... 370/252 |
| 2010/0322079 A1* | 12/2010 | Kitazoe et al. ................ 370/241 |
| 2011/0170418 A1* | 7/2011 | Sagfors et al. ................ 370/241 |
| 2011/0292824 A1 | 12/2011 | Uemura et al. |
| 2013/0051214 A1* | 2/2013 | Fong et al. ..................... 370/216 |

FOREIGN PATENT DOCUMENTS

| EP | 2410787 A1 | 1/2012 |
| JP | 2010-219820 A | 9/2010 |
| WO | 2010/084688 A1 | 7/2010 |

OTHER PUBLICATIONS

3GPP TS36.331 v8.4.0 Evolved Universal Terrestrial Radio Access (E-UTRA) Radio Resource Control (RRC); Dec. 2008.
3GPP TS36.300 v8.7.0 Evolved Universal Terrestrial Radio Access (E-UTRA) and Evolved Universal Terrestrial Radio Access Network (E-UTRAN); Overall description; Stage 2; Dec. 2008.

(Continued)

*Primary Examiner* — Hassan Kizou
*Assistant Examiner* — Abdullahi Ahmed
(74) *Attorney, Agent, or Firm* — Pearne & Gordon LLP

(57) ABSTRACT

A wireless communication apparatus can communicate with a wireless communication base station using component carriers of communication cells managed by the wireless communication base station simultaneously. A radio condition determining section includes a physical layer problem determining section that determines whether a physical layer problem occurs in each component carrier which is used or can be used in communication between the wireless communication apparatus and the wireless communication base station. When it is determined that the physical layer problem occurs in some of the component carriers used in the communication, the radio condition determining section notifies the component carrier in which the physical layer problem occurs to a report creating section. The report creating section creates a report corresponding to the component carrier in which the physical layer problem occurs and a predetermined criterion.

9 Claims, 22 Drawing Sheets

(56) References Cited

OTHER PUBLICATIONS

3GPP TS25.331 v8.5.0, Radio Resource Control (RRC); Protocol specification; Dec. 2008.
3GPP TSG-RAN WG2 Meeting #66bis, R2-093872, Radio link monitoring in a multicarrier setting; Jun. 29-Jul. 3, 2009.
Huawei; "PUCCH design for carrier aggregation" 3GPP TSG RAN Meeting#58 Shenzhen; R1-093046; 3GPP, Aug. 28, 2009; all pages.
Zte; "Radio Link Failure Trigger in a Carrier Aggregation" 3GPP TSG RAN WG2 #67 Shenzhen; R2-094705; 3GPP; Aug. 28, 2009; all pages.
International Search Report for PCT/JP2010/005703 dated Dec. 21, 2010.
Huawei; "Carrier Aggregation in Active Mode" 3GPP TSG-RAN WG2 Meeting #66; San Francisco; R2-093104; 3GPP; May 4, 2009; all pages.

* cited by examiner

WIRELESS COMMUNICATION APPARATUS, WIRELESS COMMUNICATION BASE STATION AND WIRELESS COMMUNICATION SYSTEM

TECHNICAL FIELD

The present invention relates to a wireless communication apparatus, a wireless communication base station, and a wireless communication system that can perform communication by carrier aggregation, using component carriers of a plurality of communication cells at the same time.

BACKGROUND ART

The standards body 3GPP (The 3rd Generation Partnership Project) is in the process of standardizing LTE (Long Term Evolution) as the next-generation W-CDMA (Wideband Code Division Multiple Access) communication standard (for example, see NPL 1 to NPL 3).

In LTE, a wireless communication base station (E-UTRAN NodeB (eNB)) of a network (Evolved Universal Terrestrial Radio Access Network (E-UTRAN)) includes a plurality of communication cells. The wireless communication terminal (User Equipment (UE)) belongs to any one of the communication cells. Hereinafter, the wireless communication base station (eNB) is simply referred to as a "base station", the communication cell is simply referred to as a "cell", and the wireless communication terminal (UE) is simply referred to as a "terminal".

The state of the terminal includes an idle state (RRC_IDLE) in which a radio bearer for transmitting or receiving data to or from the base station is not established and a connected state (RRC_CONNECTED) in which the radio bearer for data communication with the base station is established. When the terminal transmits or receives data to or from the base station, it needs to transition from the idle state to the connected state.

In order to prevent communication failure due to a change in the radio conditions of the component carrier that is being used, the terminal in the connected state monitors the radio conditions and reports the change in the radio conditions to the base station. The report on the change in the radio conditions is transmitted from the terminal to the base station in an RRC (Radio Resource Control) layer or a physical layer. The report in the RRC layer is used to change communication with the cell which is connected to the terminal to communication with another neighboring cell. The report in the physical layer is called a CQI (Channel Quality Indicator) report and is used to monitor the transmission rate in the communication between the terminal and the base station or control transmission power.

Next, the report on the change in the radio conditions which is performed in the RRC layer by the terminal will be described in detail.

The terminal receives the measurement configuration of a reference signal (hereinafter, simply referred to as "measurement configuration") included in an RRC connection reconfiguration transmitted from the base station. The terminal measures radio conditions (reception power or reception quality) on the basis of the measurement configuration. When an event (for example, a change in event, such as reception power being more than a predetermined threshold value) for transmitting the measurement result occurs, the terminal transmits a measurement report (MR) to the connected base station (hereinafter, referred to as a "Source eNB" or a "movement source base station").

When the radio conditions are measured at the same frequency as the carrier frequency which is being used, the terminal can perform the measurement while receiving data from the component carrier which is being used. However, during the measurement of the radio conditions at a carrier frequency different from the carrier frequency which is being used, when the terminal does not have capability to monitor a carrier frequency other than the carrier frequency which is being used while monitoring the component carrier which is being used, it needs to temporarily stop the reception of data at the carrier frequency which is being used and monitor the carrier frequency which is desired to be measured. The period for which the reception of data is temporarily stopped is called a "Measurement Gap". The setting of the measurement gap is notified as control information from the base station to the terminal.

The measurement configuration for causing the terminal to measure reception power or reception quality includes, for example, the following information:

A measurement identifier (MeasID), which is an identifier indicating the measurement configuration;

A measurement object (MeasObject) indicating an object to be measured;

Quantity configuration (QuantityConfig) indicating an operation of filtering the measurement result;

Report configuration (ReportConfig) indicating a trigger standard for transmitting a measurement report (MR) and the format of the measurement report (MR); and A measurement gap indicating the period for which data for measuring the radio conditions at another frequency or in another system is not transmitted or received.

Among these information items, the measurement identifier (MeasID), the measurement object (MeasObject), and the report configuration (ReportConfig) are associated information items.

FIG. 18 is a diagram illustrating an example of the measurement configuration. As shown in FIG. 18, the measurement configuration is formed by a combination of the measurement object identifier (MeasObjectID) and the report configuration identifier (ReportConfigID). In addition, the measurement object identifier (MeasObjectID) is an identifier indicating the measurement object (MeasObject). The report configuration identifier (ReportConfigID) is an identifier indicating the report configuration (ReportConfig).

FIG. 19 is a diagram illustrating an example of the measurement object (MeasObject). As shown in FIG. 19, the measurement object (MeasObject) includes a downlink carrier frequency (EUTRA-DL-Carrier Freq), a measurement bandwidth, a frequency offset (OffsetFreq), a removal list from a neighboring cell list (CellsToRemoveList), an addition/modification list to neighboring cells (NeighbourCellsToAddModifyList), a removal list from a black listed cell list (BlackListedCellsToRemoveList), and an addition/modification list to black listed cells (BlackListedCellsToAddModifyList).

The report configuration (ReportConfig) includes, for example, the type of trigger of the measurement report (MR), trigger quantity, report quantity, the maximum number of cells to be reported, the period of a report and a report amount. The type of trigger includes, a trigger which is transmitted when an event occurs (event trigger reporting), a trigger which is periodically transmitted (periodic reporting), and a trigger which is periodically transmitted after an event occurs (event trigger periodic reporting). For example, there are five types of events of E-UTRAN, that is, an event in which a serving cell is more than a threshold value, an event in which the serving cell is less than the threshold value, an event in which a neighboring cell is better than the serving cell, an event in which a neighboring cell is more than the threshold value, and an event in which the serving cell is less than threshold value 1 and the neighboring cell is more than threshold value 2.

The contents of the measurement report (MR) varies depending on a target to be measured. For example, the measurement report (MR) has different components when the cell of E-UTRA is measured and when radio access technology (RAT) different from E-UTRA is measured. Next, the measurement report (MR) when the cell of E-UTRA is measured will be described.

FIG. 20 is a diagram illustrating an example of the measurement report (MR). When the terminal measures the cell of E-UTRA, the measurement report (MR) includes components shown in FIG. 20. The head of the measurement report (MR) includes information of a measurement identifier (MeasID), the reference signal received power (RSRP) of a serving cell, and the reference signal received quality (RSRQ) of the serving cell. When the measurement report (MR) includes the measurement result of a neighboring cell, a portion following the head of the measurement report includes information of the neighboring cells (Neighbour cells) which satisfy an event and correspond to the maximum number of reportable cells (MaxReportCells) included in the measurement configuration. The information of the neighboring cell includes a physical cell identity (PCI). In addition, the information of the neighboring cell may optionally include a cell global identity (CGI), a tracking area code, a PLMN identity list (Public Land Mobile Network Identity List). The information of the neighboring cell may optionally include reference signal received power (RSRP) or reference signal received quality (RSRQ). The measurement configuration determines the information of RSRP or RSRQ to be included. When there are a plurality of neighboring cells, the information of the plurality of neighboring cells is included. For example, as shown in FIG. 20, the information of a first neighboring cell (Neighbour cell 1) is followed by the information of the next neighboring cell (Neighbour cell 2).

The value of the component of the measurement report (MR) varies depending on the purpose of measurement. There are three purposes, that is, a search for the best cell, SON (Self Optimizing Network), and the report of CGI. When the purpose is a search for the best cell, the measurement report (MR) has the above-mentioned structure. When the purpose is SON, the measurement report of radio access technology (RAT) different from E-UTRA and one cell to be reported are added as constraint conditions. When the purpose is the report of the CGI, a measurement report including the CGI of a neighboring cell, which is optional, is made. However, when the CGI of the neighboring cell cannot be measured, the restrictions are removed.

The terminal performs measurement indicated by a measurement identifier (MeasID) and transmits the measurement report (MR) to the base station. The base station determines whether to change the cell on the basis of the measurement report (MR). When the cell is changed, the base station determines the cell to be changed. When changing the cell, the base station starts the cell change process.

Next, a report on change in the radio conditions which is performed in the physical layer by the terminal will be described in detail.

The terminal receives a CQI report configuration included in the dedicated physical layer configuration of a dedicated radio resource configuration (Radio Resource Config Dedicated) which is included in an RRC connection reconfiguration transmitted from the base station. The terminal measures a reference signal and creates a CQI report, on the basis of the CQI report configuration. A band, which is a CQI report target, includes a wideband and a sub-band. In the case of the wideband, one CQI report is transmitted in the wideband. In the case of the sub-band, the CQI report is transmitted in each sub-band. In addition, in the case of the sub-band, there are a method of transmitting all sub-band CQI reports indicated by the base station and a method of transmitting the sub-band CQI report selected by the terminal.

Then, the terminal in the connected state checks whether synchronization with the cell is established. When the synchronization is not established, the terminal determines that the radio link is cut and re-establishes RRC connection to another cell. Next, the detailed operation of the terminal will be described.

The physical layer of the terminal monitors the quality of the radio link of the downlink of the cell to which the terminal is connected, and transmits a signal indicating in-sync or out-of-sync to an RRC layer, which is an upper layer of the terminal. When discontinuous reception (DRX) is set, the physical layer of the terminal measures the quality of the radio link at least once for each period of the discontinuous reception. When discontinuous reception is not set, the physical layer of the terminal measures the quality of the radio link for each radio frame. When the quality of the radio link is less than a threshold Qout, the physical layer of the terminal transmits a signal indicating out-of-sync to the RRC layer. On the other hand, when the quality of the radio link is more than a threshold Qin, the physical layer of the terminal transmits a signal indicating in-sync to the RRC layer.

The RRC layer of the terminal determines whether the connection between the terminal and the base station is cut or maintained on the basis of the measurement result of out-of-sync or in-sync transmitted from the physical layer of the terminal. As shown in FIG. 21, when continuously receiving the signal indicating out-of-sync from the physical layer of the terminal a predetermined number of times N310, the RRC layer of the terminal determines that a physical layer problem (PLP) occurs and starts the first operation of the timer. When continuously receiving the signal indicating in-sync from the physical layer of the terminal a predetermined number of times N311 within a predetermined period T310 from the first operation of the timer, the RRC layer of the terminal determines that synchronization is recovered from the PLP and stops the operation of the timer. When the predetermined period T310 has expired, the RRC layer of the terminal determines that RLF (Radio Link Failure) occurs and starts the second operation of the timer. The terminal temporarily stops all radio bearers except for signaling radio bearer 0 (SRB0). The terminal performs cell selection in order to search for a cell for trying to re-establish the RRC connection between the base station and another cell within a predetermined period T311 which is started from the second operation of the timer. When the cell for trying to re-establish the RRC connection is not searched within the predetermined period T311, the terminal transitions to an idle state. When the cell for trying to re-establish the RRC connection is searched within the predetermined period T311, the terminal stops the second operation of the timer and starts the third operation of the timer. The terminal tries to re-establish the RRC connection within a predetermined period T301 from the third operation of the timer. When the re-establishment of the RRC connection is not completed within the predetermined period T301, the terminal transitions to the idle state. When the re-establishment of the RRC connection is completed within the predetermined period T301, the terminal is connected to the cell and stops the operation of the timer.

Examples of the discontinuous reception (DRX) include "shortDRX" and "LongDRX". The difference between the shortDRX and LongDRX is the length of the period for which data is not received. When only the setting of shortDRX is written in control information from the base station, the terminal performs a shortDRX operation. In the case in which the setting of LongDRX is written in the control information from the base station, when data is not received for a predetermined period of time during the shortDRX operation, the terminal changes the operation mode to Long DRX.

CITATION LIST

Non Patent Literature

[NPL 1] 3GPP TS36.331 v8.4.0 "Evolved Universal Terrestrial Radio Access (E-UTRA) Radio Resource Control (RRC)"
[NPL 2] 3GPP TS36.300 v8.7.0 "Evolved Universal Terrestrial Radio Access (E-UTRA) and Evolved Universal Terrestrial Radio Access Network (E-UTRAN); Overall description; Stage 2"
[NPL 3] 3GPP TS25.331 v8.5.0, "Radio Resource Control (RRC); Protocol specification"
[NPL 4] 3GPP TSG-RAN WG2 Meeting #66bis, R2-093872, "Radio link monitoring in a multicarrier setting"

SUMMARY OF INVENTION

Technical Problem

The standards body 3GPP is in the process of standardizing LTE-A (Long Term Evolution Advanced) as the next-generation wireless communication standard which is compatible with LTE. In LTE-A, the introduction of carrier aggregation in which a terminal uses component carriers of a plurality of cells of one base station at the same time has been examined. The carrier aggregation is also called band aggregation.

FIGS. 22(a) and 22(b) are diagrams illustrating an example of the carrier aggregation. FIGS. 22(a) and 22(b) show an example in which the terminal simultaneously uses four component carriers with carrier frequencies f1, f2, f3, and f6 among six component carriers with carrier frequencies f1, f2, f3, f4, f5, and f6. As such, when a plurality of component carriers are used, it is expected that the throughput of communication between the terminal and the base station will be improved.

Next, RLF when the terminal uses a plurality of component carriers will be described. In the case in which the background art is applied without any change, when the terminal detects PLP in one component carrier and determines that RLF occurs, it performs an RRC connection re-establishment operation. However, in the case in which the terminal uses a plurality of component carriers, even when PLP occurs in one component carrier, the terminal can use another component carrier. In this state, when the terminal performs the RRC connection re-establishment operation, the connectivity of the terminal is reduced and unnecessary power consumption occurs since the terminal searches for another component carrier.

As one of the methods of solving the problems, there is a method in which a terminal notifies the component carrier in which PLP occurs to a base station using a measurement report, which is disclosed in NPL 4. However, when the measurement report on the component carrier in which PLP occurs is transmitted to the base station, the base station determines whether to instruct the terminal to perform handover to another cell or a change in the component carrier. However, since the measurement report transmitted from the terminal does not include the information of another component carrier, the base station cannot perform the determination. When the base station transmits measurement configuration to the terminal such that the terminal transmits a measurement report on another component carrier, but the terminal does not want to perform handover or change the component carrier, the above-mentioned operation is useless. In this case, the power consumption of the terminal and the consumption of radio resources increase.

In addition, NPL 4 discloses a method in which the base station determines that PLP occurs in the component carrier in which a CQI report is omitted. However, when carrier aggregation is performed between the terminal and the base station, only the use of the CQI report makes it difficult to change some component carriers.

An object of the invention is to provide a wireless communication apparatus, a wireless communication base station, and a wireless communication system capable of reducing the consumption of radio resources and power consumption.

Solution to Problem

According to an aspect of the invention, there is provided a wireless communication apparatus that can communicate with a wireless communication base station using component carriers of a plurality of communication cells managed by the wireless communication base station at the same time. The wireless communication apparatus includes: a receiving section that receives a reference signal transmitted from the wireless communication base station in each of the communication cells; a radio condition determining section that determines a radio condition of the wireless communication apparatus on the basis of the reference signal received by the receiving section; a report creating section that creates a report to be transmitted to the wireless communication base station on the basis of the determination result of the radio condition determining section; and a transmitting section that transmits the report to the wireless communication base station. The radio condition determining section includes a physical layer problem determining section that determines whether a physical layer problem occurs in each component carrier which is used or can be used in communication between the wireless communication apparatus and the wireless communication base station. When the physical layer problem determining section determines that the physical layer problem occurs in some of the plurality of component carriers used in the communication between the wireless communication apparatus and the wireless communication base station, the radio condition determining section notifies the component carrier in which the physical layer problem occurs to the report creating section. The report creating section creates a report corresponding to the component carrier in which the physical layer problem occurs and a predetermined criterion.

In the wireless communication apparatus according to the above-mentioned aspect, the report creating section may include: a monitoring carrier determining section that determines a component carrier which can be used instead of the component carrier in which the physical layer problem occurs; and a measurement configuration generating section that generates a measurement configuration for configuring the measurement of the reference signal in at least one of the plurality of communication cells managed by the wireless communication base station. When there is the measurement configuration of the component carrier determined by the monitoring carrier determining section, the report creating section may determine whether the component carrier can be used on the basis of a measurement result using the measurement configuration. When the component carrier can be used, the report creating section may generate a report including the measurement result of the component carrier and the measurement result of the component carrier in which the physical layer problem occurs. When there is no measurement configuration of the component carrier determined by the monitoring carrier determining section, the report creating section may instruct the measurement configuration generating section to generate the measurement configuration of the component carrier.

In the wireless communication apparatus according to the above-mentioned aspect, the report creating section may include: a monitoring determining section that, when the physical layer problem determining section determines that the physical layer problem occurs in some of the plurality of component carriers used in the communication between the wireless communication apparatus and the wireless communication base station, determines whether to monitor the radio condition of the component carrier in which the physical layer problem occurs or to monitor the radio condition of a component carrier other than the component carrier in which the physical layer problem occurs; a subject carrier monitoring mode report creating section that, when the monitoring determining section determines to monitor the radio condition of the component carrier in which the physical layer problem occurs, creates a report in which the measurement result of the component carrier is omitted; and an other-carrier monitoring mode report creating section that, when the monitoring determining section determines to monitor the radio condition of the component carrier other than the component carrier in which the physical layer problem occurs, creates a report including the measurement result of the component carrier and the measurement result of the component carrier in which the physical layer problem occurs.

In the wireless communication apparatus according to the above-mentioned aspect, the predetermined criterion may be the capability of the wireless communication apparatus.

In the wireless communication apparatus according to the above-mentioned aspect, the other-carrier monitoring mode report creating section may include: a monitoring carrier determining section that determines a component carrier which can be used instead of the component carrier in which the physical layer problem occurs; and a measurement configuration generating section that generates a measurement configuration for configuring the measurement of the reference signal in at least one of the plurality of communication cells managed by the wireless communication base station. When there is the measurement configuration of the component carrier determined by the monitoring carrier determining section, the other-carrier monitoring mode report creating section may determine whether the component carrier can be used on the basis of a measurement result using the measurement configuration. When the component carrier can be used, the other-carrier monitoring mode report creating section may generate a report including the measurement result of the component carrier and the measurement result of the component carrier in which the physical layer problem occurs. When there is no measurement configuration of the component carrier determined by the monitoring carrier determining section, the other-carrier monitoring mode report creating section may instruct the measurement configuration generating section to generate the measurement configuration of the component carrier.

In the wireless communication apparatus according to the above-mentioned aspect, the subject carrier monitoring mode report creating section may change a reception period of the reference signal by the receiving section according to the radio condition of a reference component carrier among the plurality of component carriers.

The wireless communication apparatus according to the above-mentioned aspect may further include: an area information management section that manages the size of the communication cell used by the wireless communication apparatus on the basis of information about the size of the communication cell which is transmitted from the wireless communication base station; and a deactivation monitoring section that monitors at least one of the component carriers configured to measure the reference signal, among the component carriers which are notified to be deactivated by the wireless communication base station. When there is a monitored component carrier and the monitored component carrier has an area smaller than that of the component carrier notified by the wireless communication base station, the deactivation monitoring section may switch the component carrier to be monitored to the component carrier notified by the wireless communication base station.

In the wireless communication apparatus according to the above-mentioned aspect, during the monitoring of the component carrier which is notified to be activated by the wireless communication base station, the deactivation monitoring section may stop the monitoring when there is no other component carrier which is configured to be measured and is deactivated, and monitor a component carrier with an area size that is equal to or more than that of the component carrier which is being monitored when there is another component carrier which is configured to be measured and is deactivated.

According to another aspect of the invention, there is provided a wireless communication base station that can communicate with the wireless communication apparatus according to the above-mentioned aspect using component carriers of a plurality of communication cells at the same time. The wireless communication base station includes: a receiving section that receives a report transmitted from the wireless communication apparatus; a physical layer problem determining section that determines whether a physical layer problem occurs in some of a plurality of component carriers used in communication between the wireless communication apparatus and the wireless communication base station on the basis of the report; a control section that temporarily stops the allocation of radio resources to the component carrier in which the physical layer problem occurs when the determination result of the physical layer problem determining section indicates that the physical layer problem occurs in some of the plurality of component carriers; and a transmitting section that transmits a reference signal to the wireless communication apparatus.

In the wireless communication base station according to the above-mentioned aspect, when information related to a component carrier other than the plurality of component carriers is included in the report, the wireless communication base station may determine that the wireless communication apparatus requires the addition of the component carrier.

According to still another aspect of the invention, a wireless communication system includes a wireless communication base station and a wireless communication apparatus that can communicate with the wireless communication apparatus using component carriers of a plurality of communication cells managed by the wireless communication base station at the same time. The wireless communication apparatus includes: a receiving section that receives a reference signal transmitted from the wireless communication base station in each of the communication cells; a radio condition determining section that determines a radio condition of the wireless communication apparatus on the basis of the reference signal received by the receiving section; a report creating section that creates a report to be transmitted to the wireless communication base station on the basis of the determination result of the radio condition determining section; and a transmitting section that transmits the report to the wireless communication base station. The radio condition determining section includes a physical layer problem determining section that determines whether a physical layer problem occurs in each component carrier which is used or can be used in communication between the wireless communication apparatus and the wireless communication base station. When the physical layer problem determining section determines that the physical layer problem occurs in some of the plurality of component carriers used in the communication between the wireless communication apparatus and the wireless communication base station, the radio condition determining section notifies the component carrier in which the physical layer problem occurs to the report creating section. The report creating section creates a report corresponding to the component carrier in which the physical layer problem occurs and a predetermined criterion. The wireless communication base station includes: a receiving section that receives the report transmitted from the wireless communication apparatus; a physical layer problem determining section that determines whether the physical layer problem occurs in some of the plurality of component carriers used in the communication between the wireless communication apparatus and the wireless communication base station on the basis of the report; a control section that temporarily stops the allocation of radio resources to the component carrier in which the physical layer problem occurs when the determination result of the physical layer problem determining section indicates that the physical layer problem occurs in some of the plurality of component carriers; and a transmitting section that transmits the reference signal to the wireless communication apparatus.

Advantageous Effects of Invention

According to the wireless communication apparatus, the wireless communication base station, and the wireless communication system of the invention, it is possible to reduce the consumption of radio resources and power consumption.

DESCRIPTION OF EMBODIMENTS

Figure 1:
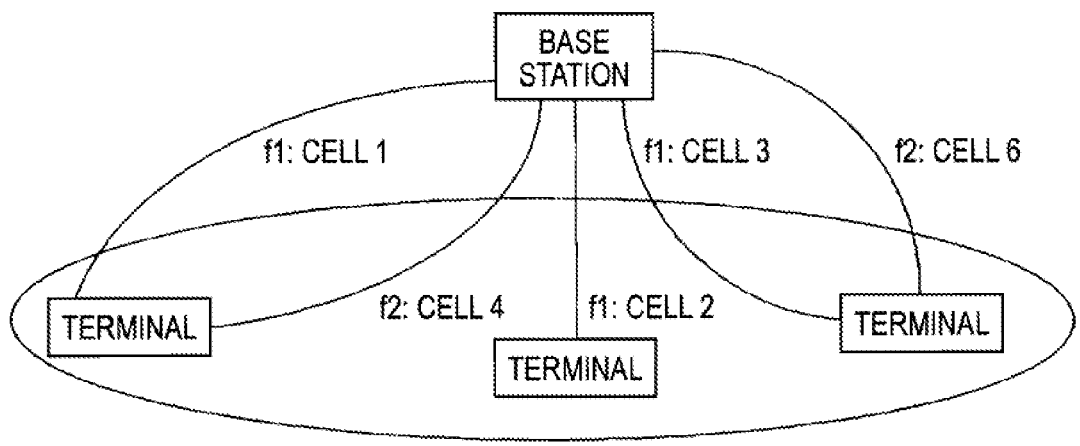
FIG. 1 is a diagram illustrating the overall structure of a wireless communication system according to an embodiment.

A wireless communication system according to an embodiment of the invention will be described in detail with reference to the accompanying drawings. The wireless communication system includes wireless communication base stations and wireless communication terminals which can communicate with each other through a wireless communication network. In the following description, the wireless communication base station is simply referred to as a "base station" and the wireless communication terminal is simply referred to as a "terminal".

Hereinafter, first to fifth embodiments will be described. First, portions common to the first to fifth embodiments will be described and then characteristic portions of the first to fifth embodiments will be described. In addition, in the first to fifth embodiments, components having the same functions are denoted by the same reference numeral and the detailed description thereof will not be repeated.

[Overall Structure of Wireless Communication System]

The wireless communication system includes a plurality of terminals and a plurality of base stations. In the wireless communication system, each base station includes a plurality of communication cells. The communication cell means a wireless network object in which the terminal can be uniquely identified on the basis of an identifier allocated from one base station to a geographical area or the difference between the frequencies used in the geographical area. In the following description, the communication cell is simply referred to as a "cell".

The terminal is, for example, a mobile phone and the base station is a base station of the mobile phone. However, the terminal is not limited to the mobile phone, and the base station is not limited to the base station of the mobile phone. The wireless communication system uses a mobile communication technique, such as LTE or LTE-A, standardized by 3GPP (The 3rd Generation Partnership Project). However, the mobile communication technique used by the wireless communication system is not limited to the above-mentioned standard, but may be a wireless LAN (Wireless Local Area Network), WiMAX (Worldwide Interoperability for Microwave Access), such as IEEE802.16, IEEE802.16e, or IEEE802.16m, 3GPP2, SAE (System Architecture Evolution), or a fourth-generation mobile communication standard.

Next, an example of the wireless communication system in which the base stations and the terminals can communicate with each other using at least one of component carriers with a plurality of carrier frequencies (for example, six frequencies f1, f2, f3, f4, f5, and f6) will be described. A plurality of cells are formed for each of the plurality of carrier frequencies by one base station.

FIG. 1 is a diagram illustrating the overall structure of a wireless communication system according to an embodiment. In the wireless communication system shown in FIG. 1, the terminals can communicate with one base station by carrier aggregation which simultaneously uses the component carriers of the plurality of cells. In the example shown in FIG. 1, the left terminal simultaneously uses the component carrier (carrier frequency is f1) of cell 1 and the component carrier (carrier frequency is f2) of cell 4 to perform carrier aggregation. The right terminal simultaneously uses the component carrier (carrier frequency is f1) of cell 3 and the component carrier (carrier frequency is f2) of cell 6 to perform carrier aggregation. The wireless communication system may include a terminal which does not have a carrier aggregation function or does not perform the carrier aggregation, such as the central terminal. In the example shown in FIG. 1, the central terminal communicates with the base station using the component carrier (the carrier frequency is f1) of the cell 2.

FIGS. 2(a) to 2(d) are diagrams schematically illustrating a plurality of cells managed by a base station according to an embodiment. In the carrier aggregation, the component carriers of the plurality of cells are simultaneously used. However, various combinations of the plurality of cells may be used. In the examples shown in FIGS. 2(a) to 2(d), one base station manages three cells (cell 1, cell 2, and cell 3) corresponding to the carrier frequency f1 and three cells (cell 4, cell 5, and cell 6) corresponding to the carrier frequency f2.

Figure 2:
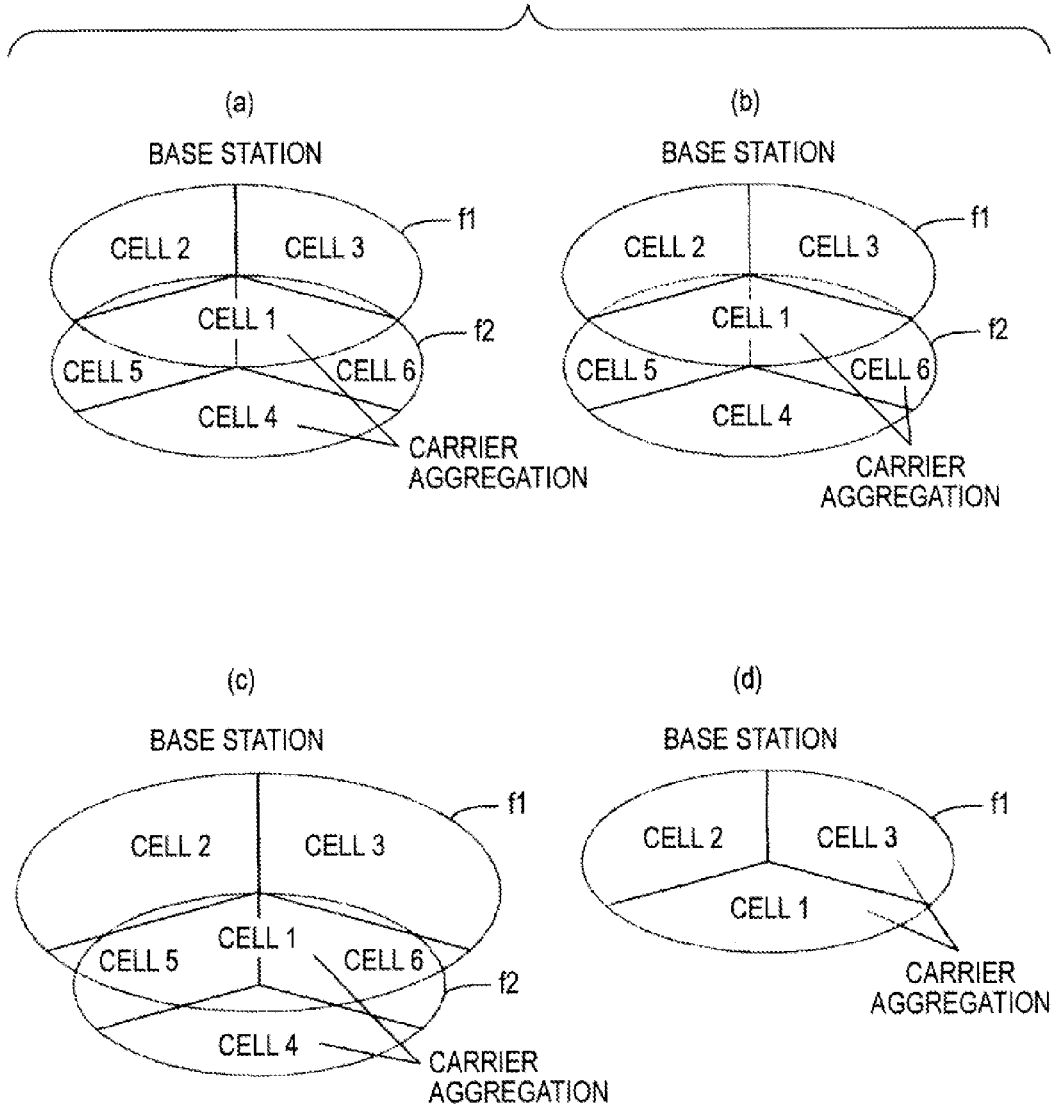
FIGS. 2(a) to 2(d) are diagrams schematically illustrating a plurality of cells managed by a base station according to an embodiment.

As an aspect in which the component carriers with a plurality of different carrier frequencies belonging to the same base station are simultaneously used, for example, the component carriers with a plurality of different carrier frequencies belonging to the same geographical area of the same base station are simultaneously used as shown in FIG. 2(a), or the component carriers with a plurality of different carrier frequencies belonging to different geographical areas of the same base station are simultaneously used as shown in FIG. 2(b). In addition, as shown in FIG. 2(c), even when the cells with different geographical sizes may be managed at different carrier frequencies of the same base station, carrier aggregation can be performed. In addition, as shown in FIG. 2(d), in some cases, a plurality of component carriers with the same carrier frequency belonging to different geographical areas of the same base station are simultaneously used. In the specification, the "carrier aggregation" includes a case in which the component carriers with a plurality of different carrier frequencies are simultaneously used as shown in FIGS. 2(a) to 2(c) and a case in which a plurality of component carriers with the same carrier frequency are simultaneously used as shown in FIG. 2(d).

The above-mentioned carrier aggregation is illustrative. That is, the number of cells used in the carrier aggregation is not limited to the examples shown in FIGS. 2(a) to 2(d). Even in the carrier aggregation, only one cell may be used depending on circumstances.

The plurality of component carriers used in the carrier aggregation are divided into "backward compatible carriers (also referred to as backward compatible component carriers)", "non-backward compatible carriers (also referred to as non-backward compatible component carriers)", and "extension carriers (also referred to as extension component carriers)" according to the properties of the component carriers.

The backward compatible carrier can be accessed by all the terminals corresponding to LTE. The terminal can be connected to the base station using only the carrier (that is, the terminal can use the carrier in a stand-alone mode). In addition, the backward compatible carrier may be used as a portion of the carrier aggregation.

The terminal defining the non-backward compatible carrier can be connected, but the terminal which does not define the non-backward compatible carrier cannot be connected. If non-backward compatibility starts from an overlap period, the terminal can be connected to the base station using the non-backward compatible carrier (that is, the terminal can use the non-backward compatible carrier in a stand-alone mode). The non-backward compatible carrier may be used as a portion of the carrier aggregation.

The extension carrier cannot be used in the stand-alone mode and is formed together with the carrier which can be used in the stand-alone mode. That is, the extension carrier is a portion of a component carrier set.

Several types of carrier aggregation may be considered.

In the first type, only a plurality of backward compatible carriers are used.

In the second type, one or a plurality of backward compatible carriers and one or a plurality of non-backward compatible carriers are used.

In the third type, one or a plurality of backward compatible carriers and one or a plurality of extension carriers are used.

In the fourth type, one or a plurality of backward compatible carriers, one or a plurality of non-backward compatible carriers, and one or a plurality of extension carriers are used.

In the fifth type, only a plurality of non-backward compatible carriers are used.

In the sixth type, one or a plurality of non-backward compatible carriers and one or a plurality of extension carriers are used.

As a standard different from the component carrier dividing method, there is a method of dividing the component carriers into anchor carriers and the other carriers. The anchor carrier is required for the terminal to establish connection to the base station and one anchor carrier is allocated to each terminal. That is, the terminal maintains connection to the base station using the anchor carrier. In this case, the type of carrier aggregation may be classified as described above. In this case, the anchor carrier may be selected from the backward compatible carriers, it may be selected from the non-backward compatible carriers, or it may be selected from the backward compatible carriers or the non-backward compatible carriers. When the anchor carrier is disconnected, the anchor carrier may be switched to another backward compatible carrier or another non-backward compatible carrier which is used by the terminal. One anchor carrier may be allocated to each band.

Next, a method using PDCCH (Physical Downlink Control Channel), which is a physical channel for transmitting physical layer control information indicating the transmission source of data to each terminal, will be described. Several methods may be considered.

In a first method, the PDCCH is used for each component carrier.

In a second method, one PDCCH is used for a set of a plurality of carriers. For example, when a set of the backward compatible carrier and the extension carrier is used, the control information of the data transmitted by the extension carrier is also included in the PDCCH transmitted by the backward compatible carrier. For example, when a set of the non-backward compatible carrier and the extension carrier is used, the control information of the data transmitted by the extension carrier is also included in the PDCCH transmitted by the non-backward compatible carrier. In this way, it is not necessary to use the PDCCH in the extension carrier and it is possible to reduce the amount of control information transmitted. As a result, it is possible to reduce the consumption of radio resources. In addition, it is possible to limit the component carriers monitored by the terminal and thus reduce power consumption.

In a third method, the PDCCH transmitted by the anchor carrier includes the control information of the component carrier used by the terminal. This method has the same effect as that of the second method.

In addition, the PDCCH may be used in methods other than the above-mentioned methods.

Next, a method of notifying notification information (System Information) will be described. The notification information is control information required for the operation of the terminal and is transmitted from the base station to the terminal. Several methods may be considered.

In a first method, the notification information is notified for each component carrier.

In a second method, the notification information required for the connection of the terminal is notified by the backward compatible carrier and the non-backward compatible carrier, and the notification information peculiar to the carrier is notified by the extension carrier.

In a third method, when a set of the backward compatible carrier and the extension carrier is used, the notification information required for the connection of the terminal is notified by the backward compatible carrier and the notification information required for the connection of the terminal is notified by the extension carrier. When a set of the non-backward compatible carrier and the extension carrier is used, the notification information required for the connection of the terminal and the notification information of the extension carrier are notified by the non-backward compatible carrier, and the notification information is not notified by the extension carrier.

In a fourth method, the notification information required for the connection of the terminal and the notification information of the extension carrier which forms a set with the backward compatible carrier and the non-backward compatible carrier are notified by the backward compatible carrier and the non-backward compatible carrier, and the notification information is not notified by the extension carrier.

The notification information may be notified by methods other than the above-mentioned methods.

Next, wireless communication systems according to the first to fifth embodiments will be described.

First Embodiment

A wireless communication system according to the first embodiment will be described. The wireless communication system according to the first embodiment includes terminals and base stations.

In the wireless communication system according to the first embodiment, the terminal has a function of receiving a reference signal which is transmitted from the base station to each cell using a downlink and reporting the measurement result calculated by a predetermined computation expression as a measurement report to the base station using an uplink. In addition, the terminal has a function of receiving the reference signal transmitted from the base station to each cell according to a CQI report configuration using the downlink and transmitting a CQI report to the base station using the uplink.

The base station serves as an access point of a radio access network for terminals and allocates and manages the radio resources (for example, a frequency band in a frequency region or a time region). In addition, the base station has a function of performing a handover process or a component carrier change process when it is determined that handover to another cell or a change in the component carrier is needed on the basis of the measurement report transmitted from the terminal.

Structure of Terminal According to First Embodiment

Figure 3:
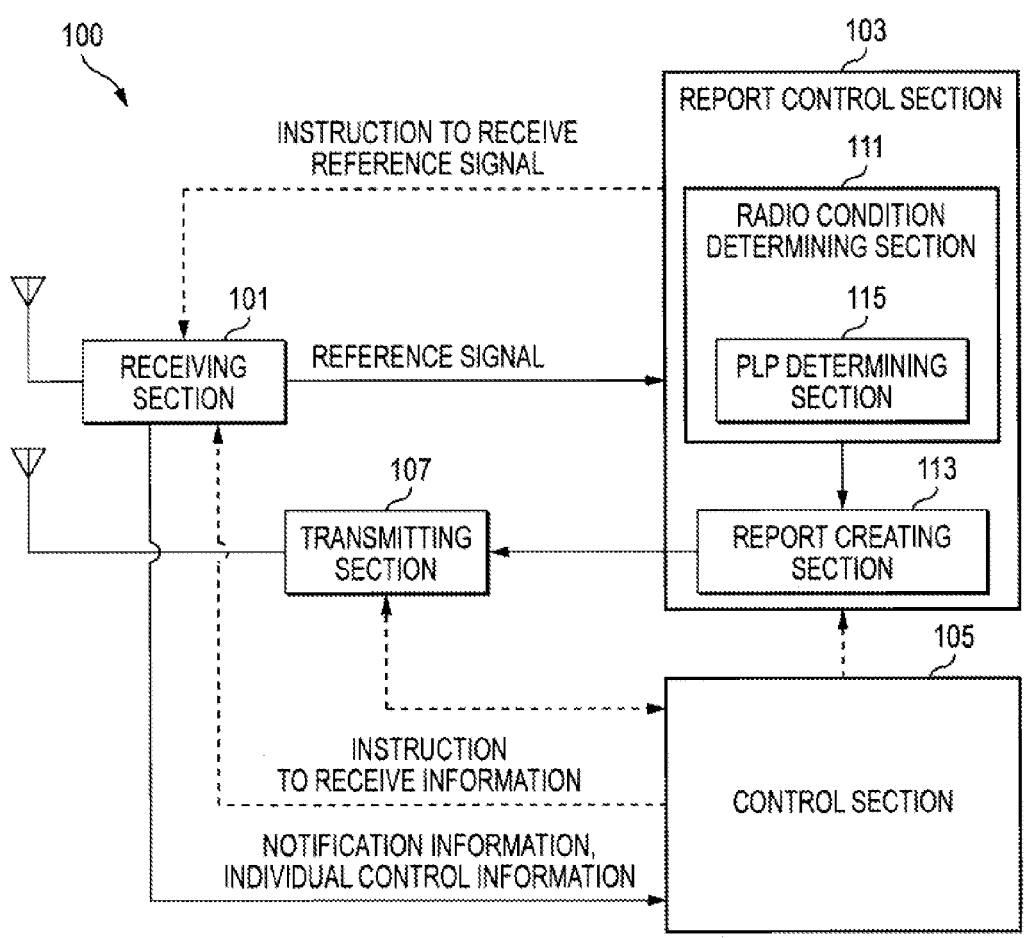
FIG. 3 is a block diagram illustrating a terminal forming the wireless communication system according to a first embodiment.

FIG. 3 is a block diagram illustrating a terminal forming the wireless communication system according to the first embodiment. As shown in FIG. 3, a terminal 100 according to the first embodiment includes a receiving section 101, a report control section 103, a control section 105, and a transmitting section 107.

The receiving section 101 receives, for example, notification information, dedicated control information, or a reference signal transmitted from the base station which manages the cell in which the terminal 100 is used or other cells, in response to instructions from the control section 105 or the report control section 103. The receiving section 101 outputs, for example, the notification information and the dedicated control information to the control section and outputs the reference signal to the report control section 103.

The report control section 103 controls the measurement of the reference signal on the basis of the CQI report configuration (CQI report config) and the measurement configuration input from the control section 105. In addition, the report control section 103 directs the receiving section 101 to measure the reference signal. The report control section 103 determines reception radio conditions on the basis of the reference signal input from the receiving section 101.

The report control section 103 includes a radio condition determining section 111 and a report creating section 113. The radio condition determining section 111 includes a PLP determining section 115. The PLP determining section 115 determines whether each component carrier used by the terminal 100 is synchronized with the base station. Next, a process when the PLP determining section 115 performs the determination will be described.

When continuously receiving a signal indicating out-of-sync, which is transmitted from the physical layer when the quality of a radio link is less than a threshold Qout in the physical layer for a predetermined period, a predetermined number of times N310, the PLP determining section 115 starts the first operation of a timer (not shown). When continuously receiving a signal indicating in-sync, which is transmitted from the physical layer when the quality of the radio link is more than a threshold Qin in the physical layer for a predetermined period, a predetermined number of times N311 within a predetermined period T310 from the first operation of the timer, the PLP determining section 115 stops the operation of the timer. When the signal indicating in-sync is not continuously transmitted from the physical layer the predetermined number of times N311 while the timer is operating and a predetermined period T310 has expired, the PLP determining section 115 determines that a physical layer problem (PLP) occurs in the component. The values of N310 and T310 set to each component carrier may be different from each other.

In the Background Art, when the signal indicating out-of-sync is continuously received the predetermined number of times N310, it is determined that PLP occurs. Thereafter, when the predetermined period T310 has expired, it is determined that RLF (Radio Link Failure) occurs. However, in this embodiment, when the predetermined period T310 has expired after the signal indicating out-of-sync was continuously received the predetermined number of times N310, the PLP determining section 115 determines that PLP occurs.

As such, according to this embodiment, it is possible to transmit information with the same reliability as that in the determination of RLF in the Background Art from the terminal to the base station. In addition, it is possible to prevent the occurrence of PLP and recovery from PLP from being frequently repeated. Therefore, it is possible to reduce the consumption of radio resources. In addition, it is possible to reduce the amount of signaling and thus reduce the power consumption of the terminal. In order to determine whether PLP occurs, any method other than the above may be used as long as it can determine whether data cannot be transmitted or received in the component carrier.

The PLP determining section 115 notifies the component carrier which is determined to have the PLP to the radio condition determining section 111. In addition, the PLP determining section 115 may determine that PLP occurs in the component carrier which cannot receive data due to the influence of the component carrier in which PLP occurs. For example, when PLP occurs in the backward compatible carrier or the non-backward compatible carrier, the PLP determining section 115 may determine that PLP occurs in the extension carrier which is used as a set with the component carrier.

A set of a component carrier A and a component carrier B means that, when connection to the component carrier A is cut while at least a portion of information required to receive data from the component carrier B is being received from the component carrier A, data is not continuously received from the component carrier B. The information required to receive data is, for example, notification information or PDCCH.

Next, an example of a method of determining whether PLP occurs using the PLP determining section 115 will be described.

When only a plurality of backward compatible carriers are used and PLP occurs in one of the backward compatible carriers, the PLP determining section 115 determines that PLP occurs in the backward compatible carrier and PLP does not occur in the other backward compatible carriers. When PLP occurs in a plurality of backward compatible carriers, the PLP determining section 115 determines that PLP occurs in these backward compatible carriers and PLP does not occur in the other backward compatible carriers.

When one or a plurality of backward compatible carriers and one or a plurality of non-backward compatible carriers are used and PLP occurs in the backward compatible carrier, the PLP determining section 115 determines that PLP occurs in the backward compatible carrier and PLP does not occur in the other component carriers. When PLP occurs in the non-backward compatible carrier, the PLP determining section 115 determines that PLP occurs in the backward compatible carrier and PLP does not occur in the other component carriers.

When one or a plurality of backward compatible carriers and one or a plurality of extension carriers are used and PLP occurs in the backward compatible carrier, the PLP determining section 115 determines that PLP occurs in the backward compatible carrier and the extension carrier which is used as a set with the backward compatible carrier and PLP occurs the component carriers. When PLP occurs in the extension carrier, the PLP determining section 115 determines that PLP occurs in the extension carrier.

When one or a plurality of backward compatible carriers, one or a plurality of non-backward compatible carriers, and one or a plurality of extension carriers are used and PLP occurs in the backward compatible carrier, the PLP determining section 115 determines that PLP occurs in the backward compatible carrier and the extension carrier which is used as a set with the backward compatible carrier and PLP does not occur in the other component carriers. When PLP occurs in the non-backward compatible carrier, the PLP determining section 115 determines that PLP occurs in the non-backward compatible carrier and the extension carrier which is used as a set with the non-backward compatible carrier and PLP does not occur in the other component carrier. When PLP occurs in the extension carrier, the PLP determining section 115 determines that PLP occurs in the extension carrier and PLP does not occur in the other component carriers.

When a plurality of non-backward compatible carriers are used and PLP occurs a non-backward compatible carrier, the PLP determining section 115 determines that PLP occurs in the non-backward compatible carrier and PLP does not occur in the other non-backward compatible carriers.

When one or a plurality of non-backward compatible carriers and one or a plurality of extension carriers are used and PLP occurs in a non-backward compatible carrier, the PLP determining section 115 determines that PLP occurs in the non-backward compatible carrier and the extension carrier which is used as a set with the non-backward compatible carrier and PLP does not occur in the other component carriers. When PLP occurs in the extension carrier, the PLP determining section 115 determines that PLP occurs in the extension carrier and PLP does not occur in the other component carriers.

When PLP simultaneously occurs in plural kinds of component carriers, the PLP determining section 115 determines that the component carrier which is determined to have PLP to be a component carrier in which PLP occurs and determines the component carrier which is determined not to have PLP to be a component carrier in which no PLP occurs, for each kind of component carriers.

The downlink has been described above, and the same structure as described above may be applied to the uplink.

In the case of the carrier aggregation, in the above-mentioned structure, the downlink is in one-to-one correspondence with the uplink, but the invention is not limited thereto. For example, one uplink may be allocated to two downlinks. Therefore, mapping is performed for correspondence between the downlink and the uplink. The mapping determines the uplink which transmits ACK (Acknowledgement) or NACK (Negative Acknowledgement) for the data received by the downlink and determines the downlink which receives ACK or NACK for the data transmitted by the uplink. When it is determined that PLP occurs in all the downlinks corresponding to the uplink by the mapping between the downlink and the uplink, the PLP determining section 115 may determine that PLP occurs in the uplink. In this case, when it is determined that PLP occurs in all the component carriers (for example, the backward compatible carrier and the non-backward compatible carrier) for determining PLP among the downlinks corresponding to the uplink, the PLP determining section 115 determines that PLP also occurs in the corresponding uplink.

When it is determined that PLP occurs in all the uplinks corresponding to the downlink by the mapping between the downlink and the uplink, the PLP determining section 115 may determine that PLP occurs in the downlink. In this case, when it is determined that PLP occurs in all the component carriers (for example, the backward compatible carrier and the non-backward compatible carrier) for determining PLP among the uplinks corresponding to the downlink, the PLP determining section 115 determines that PLP also occurs in the corresponding downlink.

As such, when a component carrier is determined not to have PLP, but cannot receive data, the radio resources are not allocated to the component carrier. Therefore, it is possible to reduce the consumption of the radio resources.

When there are a component carrier which measures the reference signal and determines PLP and a component carrier which does not measure the reference signal and determine PLP, the PLP determining section 115 performs the PLP determination only for the component carrier which measures the reference signal and determines PLP. For example, when the backward compatible carrier and the non-backward compatible carrier are set as the component carriers which measure the reference signal and determine PLP and the extension carrier is set as the component which does not measure the reference signal and determine PLP, the PLP determining section 115 performs the PLP determination only for the backward compatible carrier and the non-backward compatible carrier and does not perform the PLP determination for the extension carrier. When a set of the component carrier which measures the reference signal and determines PLP and the component which does not measure the reference signal and does not determine PLP is used, the PLP determining section 115 may perform the PLP determination for the component which does not measure the reference signal and does not determine the PLP, on the basis of the PLP determination result of the component carrier which measures the reference signal and determines PLP.

When receiving a notice indicating that the PLP occurs in at least some component carriers from the PLP determining section 115, the radio condition determining section 111 determines whether RLF (Radio Link Failure) occurs in the terminal 100. When it is determined that RLF does not occur in the terminal 100, the radio condition determining section 111 notifies the component carrier in which PLP occurs to the report creating section 113. On the other hand, when it is determined that RLF occurs in the terminal 100, the radio condition determining section 111 starts an RRC connection re-establishment process.

In the case in which the notice indicating the component carrier in which PLP occurs is transmitted to the report creating section 113, when PLP occurs in a component carrier which has an effect on the data transmission or reception of another component carrier, the radio condition determining section 111 may notify the component carrier which cannot transmit or receive data due to PLP occurring in the component carrier to the report creating section 113. For example, when a set of the backward compatible carrier and the extension carrier is used and PLP occurs in the backward compatible carrier and the extension carrier, the radio condition determining section 111 may notify only the backward compatible carrier to the report creating section 113. As such, it is possible to reduce the number of component carriers in which PLP occurs and which are notified from the terminal 100 to the base station and thus reduce the consumption of the radio resources.

The radio condition determining section 111 determines whether RLF occurs in the terminal 100 on the basis of whether there is a component carrier capable of maintaining the connection between the terminal 100 and the base station. That is, when PLP occurs in all the component carriers capable of maintaining the connection between the terminal 100 and the base station, the radio condition determining section 111 determines that RLF occurs in the terminal 100. On the other hand, when there is a component carrier in which no PLP occurs among the component carriers capable of maintaining the connection between the terminal 100 and the base station, the radio condition determining section 111 determines that RLF does not occur in the terminal 100.

There are some component carriers capable of maintaining the connection between the terminal 100 and the base station.

A first example is a component carrier which is determined to have PLP. For example, there are the backward compatible carrier and the non-backward compatible carrier. That is, when PLP occurs in all the component carriers which are determined to have PLP, RLF occurs in the terminal 100.

A second example is an uplink having a random access channel (RACH). That is, when PLP occurs in the uplink having RACH and the other uplinks do not have RACH, RLF occurs in the terminal 100.

A third example is a downlink mapped with the uplink having RACH. That is, when PLP occurs in the downlink mapped with the uplink having RACH and the other downlinks do not have RACH, RLF occurs in the terminal 100.

A fourth example is a component carrier which is independently capable of maintaining connection to the base station. For example, there are the backward compatible carrier and the non-backward compatible carrier. That is, when PLP occurs in all of the backward compatible carriers and the non-backward compatible carriers, RLF occurs in the terminal 100.

A fifth example is an anchor carrier. That is, when PLP occurs in the anchor carrier and there is no component carrier which can be used instead of the anchor carrier, RLF occurs in the terminal 100.

Some or all of the component carriers according to the first to fifth examples or component carriers other than the component carriers according to the first to fifth examples may be used to maintain the connection between the terminal 100 and the base station. As such, when the terminal 100 is disconnected from the base station, it is determined that RLF occurs and it is possible to rapidly perform the RRC connection re-establishment process.

When PLP occurs in the anchor carrier, the radio condition determining section 111 may switch the anchor carrier to a component carrier which can be used as the anchor carrier, such as the backward compatible carrier or the non-backward compatible carrier in which no PLP occurs.

When synchronization with the base station is recovered in the component carrier in which PLP occurs, the radio condition determining section 111 notifies the report creating section 113 so as to create a measurement report including the measurement result of the component carrier, in order to notify the recovery of the synchronization to the base station. In this case, the report creating section 113 creates a measurement report including the measurement result of the component carrier in which synchronization is recovered. The PLP determining section may determine whether the synchronization with the base station is recovered in the component carrier in which PLP occurs. As a determination method, when an RRC layer continuously receives the signal indicating in-sync from a physical layer a predetermined number of times N311, it is determined that the synchronization with the base station is recovered from PLP. However, the determining method is not limited thereto. The value of the component carrier in which synchronization is recovered may be included in a CQI report, instead of the measurement report.

The report creating section 113 creates a measurement report (MR) for reporting PLP to the base station and outputs the measurement report to the transmitting section 107. The report creating section 113 inserts information related to the component carrier in which PLP occurs into the measurement report. Therefore, the terminal 100 can transmit information indicating the component carrier in which PLP occurs to the base station. In addition, the report creating section 113 may measure the component carrier which is not used, using "MeasObject" included in the measurement configuration which is transmitted from the base station in advance, and create a measurement report including the measurement result of a new component carrier that is desired to be added. In this case, the monitoring of the component carrier in which PLP occurs is temporarily stopped. In this way, it is possible to measure another component carrier without acquiring a new "Measurement Gap (the period for which the reception of data is temporarily stopped)".

The report creating section 113 may create a CQI report in which CQI (Channel Quality Indicator) is removed in the component carrier in which PLP occurs, instead of the measurement report. When there is a component carrier which is desired to be newly added, the report creating section 113 may create a CQI report including the component carrier. For example, when a new component carrier is included, an index indicating the component carrier may be given to the CQI report. In this way, it is possible to measure the entire band of the component carrier or a portion (sub-band) of the band of the component carrier. In addition, the CQI report may have formats other than the above. In this case, the base station does not allocate the radio resources to the component carrier which is omitted in the CQI report on the basis of the omission of the component carrier in which PLP occurs in the CQI report. Therefore, it is possible to reduce the consumption of radio resources.

Since the CQI report notifies PLP occurring in the downlink, the terminal 100 may notify the uplink corresponding to the downlink as PLP to the base station with PHR (Power Header Room). PHR is for notifying the surplus of the transmission power of the terminal 100 to the base station. As the format of PHR, a flag for notifying PLP may be newly attached to PHR.

The control section 105 instructs the receiving section 101 to receive, for example, the notification information or the dedicated control information transmitted from the base station. The control section 105 outputs, to the report creating section 113, the measurement configuration based on the dedicated control information which is output from the receiving section 101.

A process when the control section 105 receives an inquiry about the transmission timing of the CQI report, PHR, or the measurement report from the transmitting section 107 is different when the allocation of an uplink is obtained from the receiving section 101 and when the allocation of an uplink is not obtained therefrom. That is, when the uplink is allocated, the control section 105 outputs the timing to the transmitting section 107. When the uplink is not allocated, the control section 105 instructs the transmitting section 107 to transmit a scheduling request to the base station using the radio resources for an uplink control signal which is allocated in advance, such that the uplink is allocated. When the allocation of the uplink is obtained from the receiving section 101, the control section 105 instructs the transmitting section 107 to transmit a buffer status report to the base station. Then, the control section 105 receives the allocation of the uplink from the receiving section 101 and instructs the transmitting section 107 to transmit the CQI report, PHR, or the measurement report.

The transmitting section 107 inquires the transmission timing of data, such as the CQI report, PHR, or the measurement report input from the report control section 103, of the control section 105. In addition, the transmitting section 107 transmits data, such as the CQI report, PHR, the measurement report, or the control signal, to the base station in response to instructions from the control section 105.

Structure of Base Station According to First Embodiment

Figure 4:
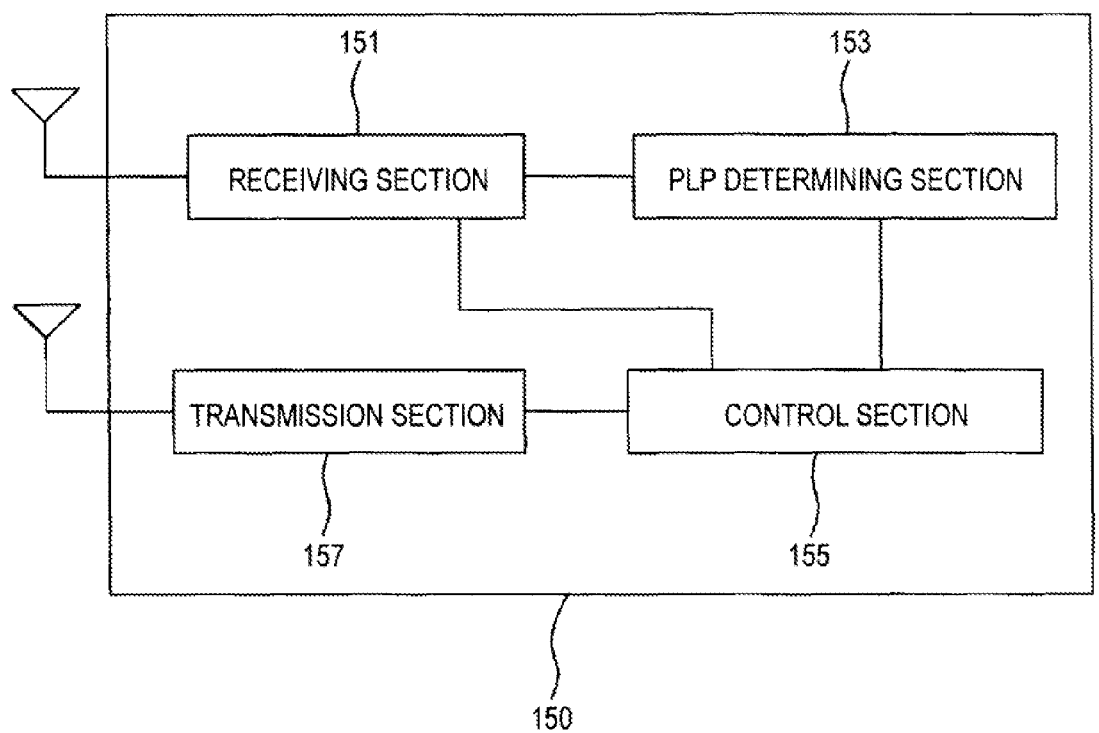
FIG. 4 is a block diagram illustrating a base station forming the wireless communication system according to the first embodiment.

FIG. 4 is a block diagram illustrating the base station forming the wireless communication system according to the first embodiment. As shown in FIG. 4, a base station 150 according to the first embodiment includes a receiving section 151, a PLP determining section 153, a control section 155, and a transmitting section 157.

The receiving section 151 receives the CQI report, PHR, or the measurement report transmitted from the terminal 100 and outputs it to the PLP determining section 153.

When a measurement report is input from the receiving section 151, the PLP determining section 153 determines whether a component carrier with a value indicating the occurrence of PLP is included in the measurement report. When the component carrier with the value indicating the occurrence of PLP is not included in the measurement report, the PLP determining section 153 determines that the measurement report is a normal measurement report and outputs the measurement report to the control section 155. When the component carrier with the value indicating the occurrence of PLP is included in the measurement report, the PLP determining section 153 outputs information related to the component carrier to the control section 155.

When the component carrier with the value indicating the occurrence of PLP is included in the measurement report, the PLP determining section 153 determines whether a component carrier other than the component carrier used by the terminal 100 is included in the measurement report. When the component carrier other than the component carrier used by the terminal 100 is included in the measurement report, the base station 150 determines that the terminal 100 requires the addition of the component carrier.

In this case, the PLP determining section 153 instructs the control section 155 to add the component carrier which is other than the component carrier used by the terminal 100 and is included in the measurement report transmitted from the terminal 100. In the case in which the component carrier with the value indicating the occurrence of PLP is included in the measurement report, even when a component carrier other than the component carrier used by the terminal 100 is included in another measurement report transmitted from the same terminal 100, the base station 150 may determine that the terminal 100 requires the addition of the component carrier. In this case, the PLP determining section 153 instructs the control section 155 to add the component carrier which is other than the component carrier used by the terminal 100 and is included in another measurement report. As such, it is possible to preferentially add the component carrier that the terminal 100 wants to add.

When the CQI report is input from the receiving section 151, the PLP determining section 153 may determine whether there is a component carrier which is used by the terminal 100 and is not included in the CQI report. When the component carrier used by the terminal 100 is not included in the CQI report, the PLP determining section 153 determines that PLP occurs in the component carrier. The PLP determining section 153 notifies the control section 155 that PLP has occurred in the component carrier. In addition, the PLP determining section 153 may determine whether the component carrier which is not used by the terminal 100 is included in the CQI report. When the component carrier which is not used by the terminal 100 is included in the CQI report, the PLP determining section 153 instructs the control section 155 to add the component carrier other than the component carrier used by the terminal 100.

When PHR is input from the receiving section 151, the PLP determining section 153 may determine whether PLP occurs on the basis of whether a value or flag indicating the occurrence of the PLP is included in PHR. When it is determined that PLP occurs, the PLP determining section 153 notifies the control section 155 that PLP has occurred in the component carrier.

When the measurement result of the component carrier which is determined to have PLP exceeds a value capable of determining that synchronization with the base station 150 has been recovered in the measurement report input from the receiving section 151, the PLP determining section 153 notifies the control section 155 that the measurement result exceeds the value. When the component carrier which is determined to have PLP is included in the CQI report input from the receiving section 151, the PLP determining section 153 may determine that synchronization with the base station 150 is recovered and notify the determination result to the control section 155, or it may have this function together with the above-mentioned functions.

When information related to the component carrier in which PLP occurs is input from the PLP determining section 153, the control section 155 checks whether the component carrier is used to control another component carrier. When the component carrier is used to control another component carrier, the control section 155 considers that PLP also occurs in the corresponding component carrier and does not allocate the radio resources.

When the information related to the component carrier in which PLP occurs is input from the PLP determining section 153, the control section 155 temporarily stops the allocation of the radio resources to the component carrier.

When receiving an instruction to add the component carrier to the terminal 100 from the PLP determining section 153, the control section 155 determines whether the component carrier can be added on the basis of the use conditions and configuration of the component carrier. When the component carrier can be added, the control section 155 creates dedicated control information for addition and outputs the dedicated control information to the transmitting section 157.

In the case in which the component carrier in which PLP occurs is input from the PLP determining section 153, when it is determined that a notice indicating the addition of a new component carrier is not received from the PLP determining section 153 or the notified component carrier is insufficient, the control section 155 may transmit measurement configuration to the terminal 100 and measure another component carrier.

When a normal measurement report is input from the PLP determining section 153, the control section 155 determines whether to instruct the terminal 100 to perform handover to another cell or to change the component carrier. When it is determined that the handover or the change in the component carrier is instructed only by the input measurement report, the control section 155 performs the handover or the change in the component carrier. On the other hand, when it is determined that the handover or the change in the component carrier is not instructed only by the input measurement report and the terminal 100 is instructed to measure another component carrier, the control section 155 instructs the transmitting section 157 to transmit the measurement configuration to the terminal 100. When it is determined that the handover or the change in the component carrier is not instructed only by the input measurement report and a new measurement result is not particularly required, the control section 155 does not perform any process.

When a signal indicating that synchronization is recovered in the component carrier in which PLP occurs is input from the PLP determining section 153, the control section 155 resumes the allocation of the radio resources to the component carrier.

The transmitting section 157 transmits, for example, the reference signal or the control information to the terminal 100 on the basis of schedule information.

Second Embodiment

A wireless communication system according to a second embodiment will be described. The wireless communication system according to the second embodiment includes terminals and the base stations provided in the wireless communication system according to the first embodiment.

In the wireless communication system according to the second embodiment, the terminal has a function of receiving a reference signal which is transmitted from the base station to each cell using a downlink and reporting the measurement result calculated by a predetermined computation expression as a measurement report to the base station using an uplink. In addition, the terminal has a function of receiving the reference signal transmitted from the base station to each cell according to a CQI report configuration using the downlink and transmitting a CQI report to the base station using the uplink.

The base station serves as an access point of a radio access network for terminals and allocates and manages the radio resources (for example, a frequency band in a frequency region or a time region). In addition, the base station has a function of performing a handover process or a component carrier change process when it is determined that handover to another cell or a change in the component carrier is needed on the basis of the measurement report transmitted from the terminal.

Structure of Terminal According to Second Embodiment

Figure 5:
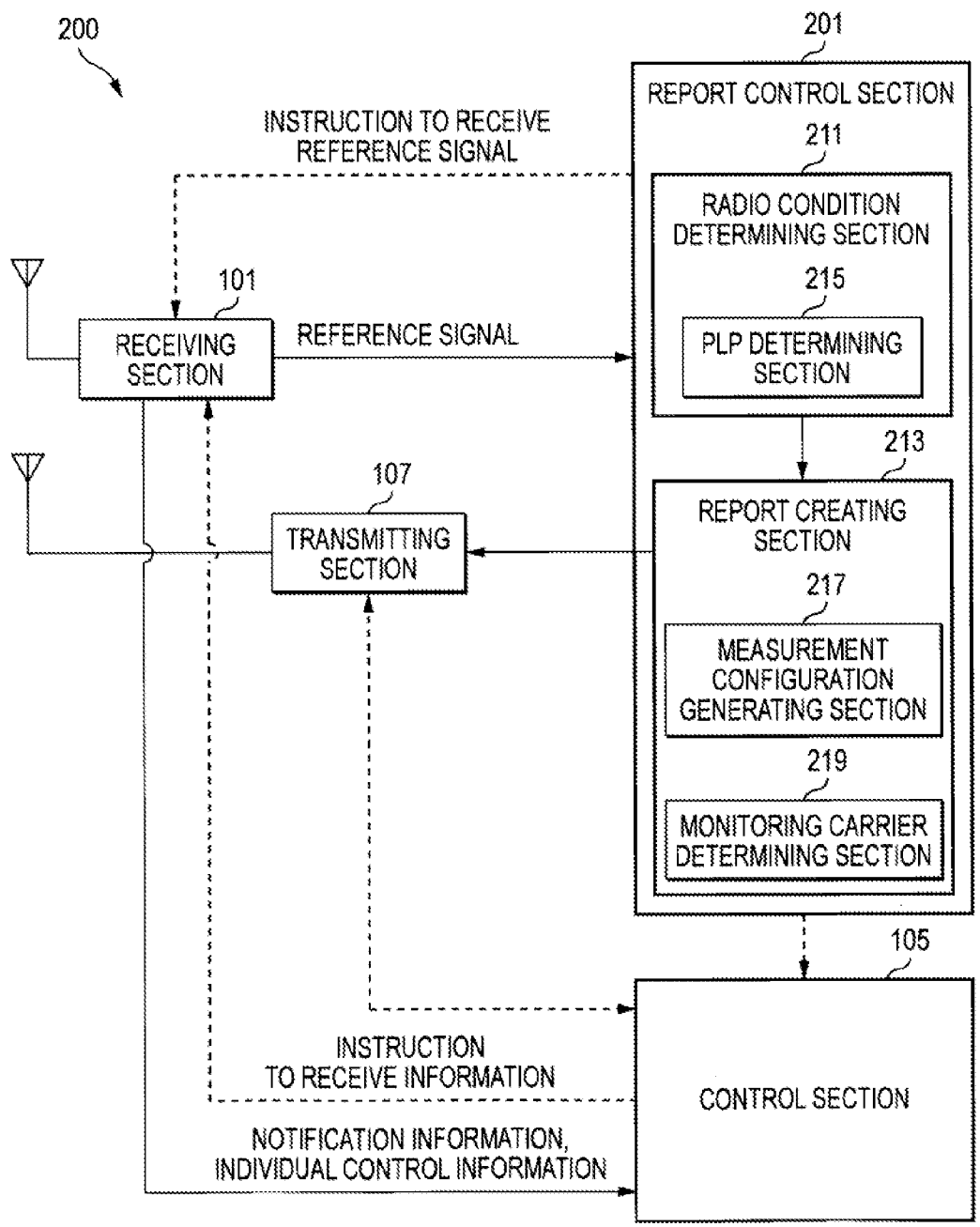
FIG. 5 is a block diagram illustrating a terminal forming a wireless communication system according to a second embodiment.

FIG. 5 is a block diagram illustrating a terminal forming the wireless communication system according to the second embodiment. As shown in FIG. 5, a terminal 200 according to the second embodiment includes a receiving section 101, a report control section 201, a control section 105, and a transmitting section 107. The terminal 200 according to this embodiment differs from the terminal 100 according to the first embodiment in the structure of the report creating section. Therefore, among the components of the terminal 200 according to this embodiment, the same components (the receiving section 101, the control section 105, and the transmitting section 107) as those of the terminal 100 according to the first embodiment are denoted by the same reference numerals and the detailed description thereof will not be repeated.

The report control section 201 includes a radio condition determining section 211 and a report creating section 213, similarly to the report control section 201 according to the first embodiment. The radio condition determining section 211 has the same function as the radio condition determining section 111 according to the first embodiment. The report creating section 213 includes a measurement configuration generating section 217 and a monitoring carrier determining section 219, in addition to the function of the report creating section 113 according to the first embodiment.

When component carrier information is input from the report creating section 213 and there is an instruction to generate the measurement configuration of the component carrier indicated by the information, the measurement configuration generating section 217 generates the measurement configuration of the component carrier. The measurement configuration generating section 217 outputs the generated measurement configuration to the report creating section 213.

The measurement configuration generating section 217 generates the measurement configuration of the component carrier using the following methods.

A first example is a method of generating the measurement configuration on the basis of the measurement configuration set in an anchor carrier.

A second example is a method of generating the measurement configuration on the basis of the measurement configuration of the component carrier in which PLP occurs. When the component carrier in which PLP occurs is an extension carrier and there is no measurement configuration, a method of generating the measurement configuration on the basis of the measurement configuration of a component carrier which is used as a set with the extension carrier may be used.

A third example is a method of generating the measurement configuration on the basis of the measurement configuration of another component carrier in the same frequency band as that including the component carrier which generates the measurement configuration.

A fourth example is a method of generating the measurement configuration on the basis of the measurement configuration of a backward compatible carrier or a non-backward compatible carrier which forms a set with an extension carrier when the extension carrier is measured.

A fifth example is the following method: when a backward compatible carrier is measured, the measurement configuration set in another backward compatible carrier is used; when a non-backward compatible carrier is measured, the measurement configuration set in another non-backward compatible carrier is used; and when an extension carrier is measured, the measurement configuration set in another extension carrier is used.

The above-mentioned examples may be combined with each other, or methods other than the above-mentioned examples may be used to generate the measurement configuration. As such, the terminal 200 can measure the component carrier without a measurement configuration, without receiving the measurement configuration from a new base station. The reason why the measurement configuration of the carrier which is not used by the terminal can be generated is as follows. Noting that it is difficult to receive data using the component carrier in which PLP occurs, another carrier frequency is measured, instead of monitoring the component carrier in which PLP is generated, which makes it unnecessary to receive a "Measurement Gap (the period for which the reception of data is temporarily stopped)" from a new base station.

The monitoring carrier determining section 219 determines the component carrier to be measured, on the basis of the information input from the report creating section 213. The monitoring carrier determining section 219 determines a component carrier which can be used instead of the component carrier in which PLP occurs. The monitoring carrier determining section 219 outputs the determined component carrier to the report creating section 213. When information indicating that the determined component carrier cannot be used is input from the report creating section 213, the monitoring carrier determining section 219 determines another component carrier which can be used instead of the component carrier in which PLP occurs and outputs the determined component carrier to the report creating section 213.

There are some conditions for determining the component carrier which can be used instead of the component carrier in which PLP occurs.

As the first condition, an unused component carrier can be used.

As the second condition, when PLP occurs in the anchor carrier, a component carrier which is usable as the anchor carrier can be used.

As the third condition, when the component carriers belonging to different frequency bands are used, a component carrier belonging to a frequency band different from the frequency band of the component carrier in which PLP occurs can be used.

As the fourth condition, when PLP occurs in a backward compatible carrier or a non-backward compatible carrier, a component carrier, such as the backward compatible carrier or the non-backward compatible carrier, can be used.

As the fifth condition, a component carrier that is easy to set can be used. For example, when PLP occurs in an extension carrier, a component carrier, such as the backward compatible carrier which is used as a set with the extension carrier or another extension carrier which is used as a set with the non-backward compatible carrier, can be used. In addition, for example, a component carrier capable of obtaining frequency information can be used.

As the sixth condition, a component carrier which can be used simultaneously with the component carrier which is being used can be used.

As the seventh condition, among the configured component carriers, a deactivated component carrier can be used. The deactivated component carrier is in a component-carrier-configured state and makes it difficult for the terminal to transmit or receive data. In this way, only the operation of the base station notifying activation to the terminal enables the terminal to start the use of the component carrier. Therefore, it is possible to rapidly start the use of the component carrier, as compared to other component carriers. In addition, since the base station does not transmit the configuration information of the component carrier, it is possible to reduce the amount of radio resources used by a value corresponding to the configuration information.

In addition, measurement may be performed from the component carrier satisfying all of the above-mentioned conditions or the component carrier satisfying some of the above-mentioned conditions. When the component carrier to be measured is limited in this way, it is possible to reduce the time required to measure the component carrier. In addition, when the component carrier replacing the component carrier in which PLP occurs is selected as represented in the above-mentioned conditions, it is easy to maintain QoS (Quality of Service) before PLP occurs.

When the measurement configuration of the component carrier is input from the monitoring carrier determining section 219, the report creating section 213 performs measurement using the measurement configuration. When the measurement configuration of the component carrier is not input from the monitoring carrier determining section 219, the report creating section 213 instructs the measurement configuration generating section 217 to generate the measurement configuration of the component carrier.

The report creating section 213 determines whether the component carrier can be used, on the basis of the measurement result of the component carrier input from the monitoring carrier determining section 219. When it is determined that the component carrier cannot be used, the report creating section 213 outputs information indicating that the component carrier cannot be used to the monitoring carrier determining section 219. When it is determined that the component carrier can be used, the report creating section 213 generates a measurement report including the measurement result of the component carrier and the measurement result of the component carrier in which PLP occurs and outputs the measurement report to the transmitting section 107. The report creating section 213 may generate two measurement reports respectively including the two measurement results. In addition, a CQI report may be used instead of the measurement report.

Third Embodiment

A wireless communication system according to a third embodiment will be described. The wireless communication system according to the third embodiment includes terminals and base stations.

In the wireless communication system according to the third embodiment, the terminal has a function of receiving a reference signal transmitted from the base station to each cell using a downlink and reporting the measurement result calculated by a predetermined computation expression as a measurement report to the base station using an uplink. In addition, the terminal has a function of receiving the reference signal transmitted from the base station to each cell according to a CQI report configuration using the downlink and transmitting a CQI report to the base station using the uplink.

The base station serves as an access point of a radio access network for terminals and allocates and manages the radio resources (for example, a frequency band in a frequency region or a time region). In addition, the base station has a function of performing a handover process or a component carrier change process when it is determined that handover to another cell or a change in the component carrier is needed on the basis of the measurement report transmitted from the terminal.

Structure of Terminal According to Third Embodiment

Figure 6:
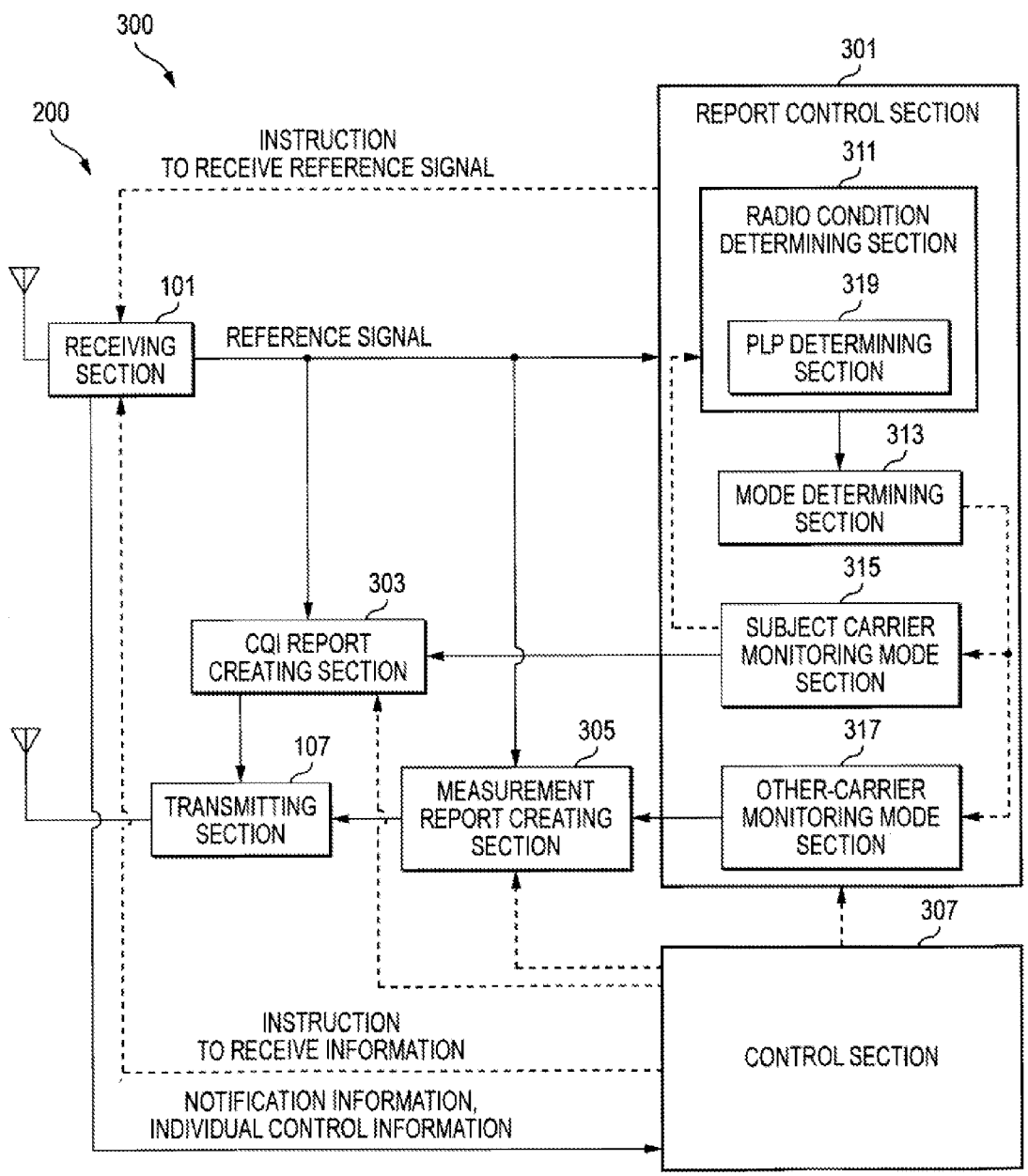
FIG. 6 is a block diagram illustrating a terminal forming a wireless communication system according to a third embodiment.

FIG. 6 is a block diagram illustrating a terminal forming the wireless communication system according to the third embodiment. As shown in FIG. 6, a terminal 300 according to the third embodiment includes a receiving section 101, a report control section 301, a CQI report creating section 303, a measurement report creating section 305, a control section 307, and a transmitting section 107. The terminal 300 according to this embodiment differs from the terminal 100 according to the first embodiment in the structure of the report control section and the control section. Therefore, among the components of the terminal 300 according to this embodiment, the same components (the receiving section 101 and the transmitting section 107) as those of the terminal 100 according to the first embodiment are denoted by the same reference numerals and the detailed description thereof will not be repeated.

The report control section 301 controls the measurement of the reference signal on the basis of a CQI report configuration (CQI report config) or a measurement configuration input from the control section 307. In addition, the report control section 301 instructs the receiving section 101 to measure the reference signal. The report control section 301 determines radio conditions on the basis of the reference signal input from the receiving section 101.

The report control section 301 includes a radio condition determining section 311, a mode determining section 313, a subject carrier monitoring mode section 315, and an other-carrier monitoring mode section 317. The radio condition determining section 311 includes a PLP determining section 319. The PLP determining section 319 has the same function as the PLP determining section 115 according to the first embodiment.

The radio condition determining section 311 according to the third embodiment has substantially the same function as the radio condition determining section 311 according to the first embodiment. When it is determined that RLF does not occur in the terminal 300, the radio condition determining section 311 notifies the component carrier in which PLP occurs to the mode determining section 313.

When receiving a notice indicating the occurrence of PLP in the component carrier from the radio condition determining section 311, the mode determining section 313 determines whether to monitor its own carrier or other carriers on the basis of a criterion which is set in the terminal 300 in advance or a criterion which is transmitted from the base station.

When it is determined that the terminal monitors its own carrier in order to wait for the recovery of synchronization with the base station in the component carrier in which PLP occurs, the mode determining section 313 outputs information indicating the component carrier in which PLP occurs to the subject carrier monitoring mode section 315. On the other hand, when it is determined that the terminal 300 monitors other carriers in order to use new other component carriers, the mode determining section 313 outputs information indicating the component carrier in which PLP occurs to the other-carrier monitoring mode section 317.

For example, QoS (Quality of Service) is used as the criterion of the mode determining section 313. It is considered that the QoS of the terminal is affected by throughput and delay. In the case in which throughput is used as QoS serving as the criterion, when throughput can be maintained using all the component carriers except for the component carrier in which PLP occurs or the terminal 300 is satisfied with reduced throughput, the mode determining section 313 determines to monitor the subject carrier. On the other hand, when throughput cannot be maintained using all the component carriers except for the component carrier in which PLP occurs or the terminal 300 cannot be satisfied with the reduced throughput, the mode determining section 313 determines to monitor other carriers.

In the case in which delay is used as QoS serving as the criterion, when the delay time can be maintained using all the component carriers except for the component carrier in which PLP occurs or the terminal 300 is satisfied with a prolonged delay time, the mode determining section 313 determines to monitor the subject carrier. On the other hand, when the delay time cannot be maintained using the component carrier other than the component carrier in which PLP occurs or the terminal 300 cannot be satisfied with the prolonged delay time, the mode determining section 313 determines to monitor other carriers.

As such, when the terminal 300 can be satisfied with QoS, the mode determining section 313 selects the subject carrier monitoring mode. Therefore, it is possible to reduce unnecessary signaling and measurement. As a result, it is possible to reduce the consumption of the radio resources and reduce the power consumption of the terminal 300. On the other hand, when the terminal 300 cannot be satisfied with QoS, the mode determining section 313 selects the other-carrier monitoring mode. Therefore, other carriers are measured and handover or a change in the component carrier is performed. In this way, it is considered that a reduction in QoS can be supplemented.

The following criteria of the mode determining section 313 are considered other than the above-mentioned QoS.

In a first example, the mode determining section 313 determines whether to monitor the subject carrier or other carriers on the basis of whether PLP occurs in a component carrier which affects other component carriers or a component carrier which does not affect other component carriers. When PLP occurs in the component carrier which affects other component carriers, the mode determining section 313 determines to monitor other carriers. On the other hand, when PLP occurs in the component carrier which does not affect other component carriers, the mode determining section 313 determines to monitor the subject carrier.

As such, when the component carrier affects other component carriers, that is, a reduction in QoS is large, it is considered that the reduction in QoS can be supplemented by performing handover or a change in the component carrier on the basis of the other-carrier monitoring mode. On the other hand, when the component carrier does not affect other component carriers, that is, a reduction in QoS is small, it is possible to reduce the consumption of the radio resources and the power consumption of the terminal by waiting for the recovery of the component carrier from PLP on the basis of the subject carrier monitoring mode.

There are the following three examples of a set of the component carrier which affects other component carriers and the component carrier which does not affect other component carriers.

As a first example, the component carrier which affects other component carriers is a backward compatible carrier and a non-backward compatible carrier and the component carrier which does not affect other component carriers is an extension carrier.

As a second example, the component carrier which affects other component carriers is an anchor carrier and a non-backward compatible carrier, and the component carrier which does not affect other component carriers is a component carrier other than the component carrier of the anchor carrier.

As a third example, the component carrier which affects other component carriers is a component carrier which notifies PDCCH and the component carrier which does not affect other component carriers is a component carrier which does not notify PDCCH.

In addition, sets of the component carrier which affects other component carriers and the component carrier which does not affect other component carriers other than the above-mentioned three sets may be used.

In the second example, the mode determining section 313 determines whether to monitor the subject carrier or other carriers on the basis of the reception quality of the component carrier in which no PLP occurs. When the reception quality of the component carrier in which no PLP occurs is good, the mode determining section 313 determines to monitor the subject carrier. When the reception quality of the component carrier in which no PLP occurs is bad, the mode determining section 313 determines to monitor other carriers. The reception quality is determined by measurement or CQI.

When there is a plurality of component carriers in which PLP occurs, there are some determination methods of the mode determining section 313. One determination method is based on the number of component carriers exceeding a standard for determining whether the reception quality (or reception power) is good or bad. According to this method, it is possible to accurately determine whether QoS can be satisfied. Another determination method is to select a reference component carrier and determine the reception quality (or reception power) of the component carrier. According to this method, the number of criteria is reduced and it is easy to perform mounting. In addition, there are some methods of selecting the reference component carrier. A first method selects an anchor carrier as the reference component carrier. A second method selects a backward compatible carrier or a non-backward compatible carrier as the reference component carrier. A third method selects a component carrier which transmits PDCCH as the reference component carrier. In addition, the reference component carrier may be selected by methods other than the above-mentioned three methods.

In the third example, the mode determining section 313 determines whether to monitor the subject carrier or other carriers on the basis of whether discontinuous reception (DRX) is set. When DRX is set, the mode determining section 313 determines to monitor the subject carrier. When DRX is not set, the mode determining section 313 determines to monitor other carriers.

The mode determining section 313 may perform the determination on the basis of whether the component carrier performs DRX, not whether DRX is set. In this case, when the component carrier performs DRX, the mode determining section 313 determines to monitor the subject carrier. When the component carrier does not perform DRX, the mode determining section 313 determines to monitor other carriers.

In addition, the mode determining section 313 may perform the determination on the basis of whether the component carrier performs Long DRX. In this case, when the component carrier performs Long DRX, the mode determining section 313 determines to monitor the subject carrier. When the component carrier does not perform Long DRX, the mode determining section 313 determines to monitor other carriers. When DRX is performed, it is considered that a small number of reception opportunities do not matter. Therefore, when QoS is satisfied, it is possible to perform the determination.

In a fourth example, the mode determining section 313 determines whether to monitor the subject carrier or other carriers on the basis of the amount of buffer of the downlink. When the terminal 300 transmits a signal for inquiring about the amount of buffer of the downlink to the base station, the base station transmits a signal for notifying the amount of buffer of the downlink to the terminal 300. The terminal 300 stores a table indicating throughput (for example, the total bandwidth of the component carriers used) suitable for the amount of buffer of the downlink in advance. When the number of component carriers is sufficient, the mode determining section 313 determines to monitor the subject carrier, in order to realize throughput for the amount of buffer of the downlink. On the other hand, when the number of component carriers is insufficient, the mode determining section 313 determines to monitor other carriers.

In a fifth example, the mode determining section 313 determines whether to monitor the subject carrier or other carriers on the basis of whether component carriers are used under different radio conditions. When the terminal 300 uses one frequency band to perform carrier aggregation, the mode determining section 313 determines to monitor the subject carrier. On the other hand, when the terminal 300 uses a plurality of different frequency bands to perform carrier aggregation, the mode determining section 313 determines to monitor other carriers.

In a sixth example, the mode determining section 313 determines whether to monitor the subject carrier or other carriers on the basis of whether the measurement of other carriers are set in advance. When the measurement of the component carrier which is not used is not set, the mode determining section 313 determines to monitor the subject carrier. On the other hand, when the measurement of the component carrier which is not used is set, the mode determining section 313 determines to monitor other carriers.

In a seventh example, the mode determining section 313 determines whether to monitor the subject carrier or other carriers on the basis of the capability (UE capability) of the terminal 300. When the terminal 300 has the capability to monitor other component carriers while using its own component carrier, the mode determining section 313 determines to monitor other carriers. On the other hand, when the terminal 300 does not have the capability to monitor other component carriers while using its own component carrier, the mode determining section 313 determines to monitor the subject carrier.

In an eighth example, the mode determining section 313 determines whether to monitor the subject carrier or other carriers on the basis of whether there is a component carrier which can be used together with the component carrier used by the terminal 300 within the capability (UE capability) of the terminal 300. That is, when there is a component carrier which can be used together with the component carrier used by the terminal 300, the mode determining section 313 determines to monitor other carriers. On the other hand, when there is no component carrier which can be used together with the component carrier used by the terminal 300, the mode determining section 313 determines to monitor the subject carrier.

It is possible to determine whether there is a component carrier which can be used together with the component carrier used by the terminal 300 by adding a postscript indicating a backward compatible carrier, a non-backward compatible carrier, or an extension carrier to a frequency list transmitted from the base station. When there is a backward compatible carrier or a non-backward compatible carrier within the capability (UE capability) of the terminal 300, the mode determining section 313 determines to monitor other carriers. In addition, when there is an extension carrier within the capability (UE capability) of the terminal 300 and there is a component carrier which is used by the terminal 300 and transmits PDCCH for the extension carrier, the mode determining section 313 determines to monitor other carriers. When there is an extension carrier within the capability (UE capability) of the terminal 300 and there is a component carrier which is used as a set with the extension carrier within the capability (UE capability) of the terminal 300, the mode determining section 313 may determine to monitor other carriers. In the other cases, the mode determining section 313 determines to monitor the subject carrier. Next, detailed examples will be described.

Figure 7:
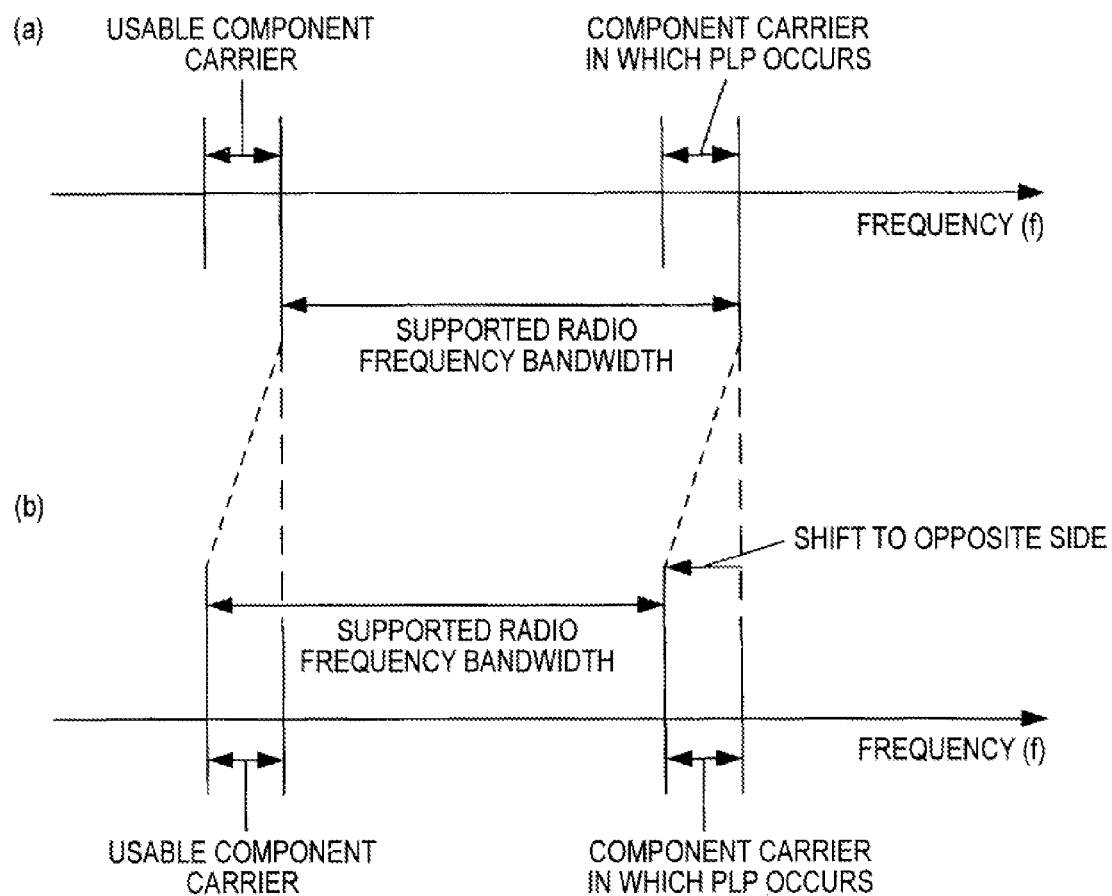
FIGS. 7(a) and 7(b) are diagrams illustrating an example in which, when PLP occurs in a component carrier at one end of a radio frequency bandwidth, the radio frequency bandwidth shifts to a side opposite to the position of the component carrier in which PLP occurs.

As one example, in the case in which the terminal 300 uses the entire supported radio frequency bandwidth (for example, 60 MHz), when PLP occurs in the component carrier at one end of the radio frequency bandwidth used by the terminal 300 and there is a usable component carrier at the other end of the radio frequency bandwidth as shown in FIG. 7(a), the mode determining section 313 determines to monitor other carriers. In this case, as shown in FIG. 7(b), the radio frequency bandwidth to be monitored is shifted in a direction opposite to the position of the component carrier in which PLP occurs. In this way, it is possible to monitor the component carrier opposite to the component carrier in which PLP occurs while using the component carrier which is currently used.

As a second example, in the case in which the terminal 300 uses the entire supported radio frequency bandwidth, when PLP occurs in a component carrier other than the component carrier at the end of the radio frequency bandwidth used by the terminal 300, the mode determining section 313 determines to monitor the subject carrier.

As a third example, in the case in which the terminal 300 uses a portion of the supported radio frequency bandwidth, when PLP occurs in the component carrier which is currently being used and there is a usable component carrier in the radio frequency bandwidth, the mode determining section 313 determines to monitor other carriers.

As a fourth example, when the terminal 300 supports only one frequency band (for example, a frequency band of 800 MHz or a frequency band of 2 GHz), the same determination method as described above can be applied.

As a fifth example, when the terminal 300 supports two frequency bands (for example, frequency bands of 800 MHz and 2 GHz), but does not use two frequency bands at the same time, the same determination method as described above can be applied in the frequency band which is being used.

As a sixth example, in the case in which the terminal 300 supports two or more frequency bands (for example, frequency bands of 800 MHz and 2 GHz) and can use two or more frequency bands at the same time, when PLP occurs in one frequency band (for example, a frequency band of 2 GHz) and there is a component carrier which can be used in the frequency band, the mode determining section 313 determines to monitor other carriers in the frequency band. On the other hand, when there is no component carrier which can be used in the frequency band and there is a component carrier which can be used in another frequency band (for example, a frequency band of 800 MHz), the mode determining section 313 determines to monitor other carriers in another frequency band.

As a seventh example, in the case in which the terminal 300 supports two or more frequency bands (for example, frequency bands of 800 MHz and 2 GHz) and can use two or more frequency bands at the same time among the frequency bands, when the PLP occurs in one frequency band (for example, a frequency band of 2 GHz) and there is a component carrier which can be used in another frequency band (for example, a frequency band of 800 MHz), the mode determining section 313 determines to monitor other carriers in another frequency band. On the other hand, when there is no component carrier which can be used in another frequency band (a frequency band of 800 MHz) and there is no component carrier which can be used in the frequency band (a frequency band of 2 GHz) in which PLP occurs, the mode determining section 313 determines to monitor other carriers in the frequency band in which PLP occurs.

The above-mentioned detailed example is an example of the capability of the terminal 300. The terminal 300 puts the component carrier which is being used and the deactivated component carrier into the supported radio frequency bandwidth. In this way, it is possible to continuously use the component carrier which is being used. In addition, when the deactivated component carrier is activated, it is possible to instantaneously use the activated component carrier.

When only the information of the backward compatible carrier and the non-backward compatible carrier is written in the frequency list and the information of the extension carrier is not written in the frequency list, the terminal 300 does not notify the existence of the extension carrier. Therefore, the mode determining section 313 determines that the extension carrier is absent. In this case, it is not necessary to add a postscript indicating the backward compatible carrier or the non-backward compatible carrier to the frequency list. In this way, even when the extension carrier is not written in the frequency list, the same operation as that in the above-mentioned detailed example can be performed.

When information indicating the backward compatible carrier, the non-backward compatible carrier, and the extension carrier is not written in the frequency list and a frequency written in the frequency list is within the capability of the terminal 300, the terminal 300 acquires information at the frequency and checks whether there is a usable component carrier. In this way, the mode determining section 313 can perform the same determination process as that in the detailed example, without adding a postscript to the frequency list.

As described above, it is determined whether to monitor other carriers or the subject carrier on the basis of the capability (UE capability) of the terminal 300. Therefore, it is possible to effectively use the capability (UE capability) of the terminal 300.

The mode determining section 313 may determine whether to monitor other carriers or the subject carrier using methods other than the above-mentioned methods.

When information indicating the component carrier in which PLP occurs is input from the mode determining section 313, the subject carrier monitoring mode section 315 instructs the CQI report creating section 303 to create a CQI report for reporting the occurrence of PLP to the base station. The CQI report creating section 303 creates a CQI report from which the CQI of the component carrier in which PLP occurs is excluded and outputs the CQI report to the transmitting section 107. In the case, the base station does not allocate the radio resources to the component carrier whose CQI is omitted, on the basis of the omission of the component carrier in which PLP occurs from the CQI report. Therefore, it is possible to reduce the consumption of the radio resources.

Since the CQI report notifies PLP occurring in the downlink, the terminal 300 may notify the uplink corresponding to the downlink as PLP to the base station with PHR (Power Header Room). PHR is for notifying the surplus of the transmission power of the terminal 300 to the base station. As the format of PHR, a flag for notifying PLP may be newly attached to PHR.

The subject carrier monitoring mode section 315 continuously monitors the component carrier in which PLP occurs. When it is determined that synchronization with the base, station is recovered in the component carrier which is determined to have PLP, the subject carrier monitoring mode section 315 outputs information indicating the component carrier which is recovered from PLP to the radio condition determining section 311. When a signal indicating in-sync is continuously received from the physical layer a predetermined number of times N311 in the RRC layer, the subject carrier monitoring mode section 315 determines that synchronization with the base station has been recovered from PLP. However, the determining method is not limited thereto.

The subject carrier monitoring mode section 315 instructs the CQI report creating section 303 to create a CQI report again in order to notify the base station that synchronization with the base station has been recovered in the component carrier in which PLP occurs. In this case, the CQI report creating section 303 creates a CQI report including the CQI of the component carrier in which synchronization is recovered. As such, the component carrier in which PLP has occurred, but synchronization with the base station has been recovered enables the base station to allocate the radio resources again. In addition, as a method of notifying the base station that synchronization with the base station has been recovered in the component carrier in which PLP occurs, a method inserting the recovery into the measurement report, not the CQI report, may be used.

When information indicating the component carrier in which PLP occurs is input from the mode determining section 313, the other-carrier monitoring mode section 317 instructs the measurement report creating section 305 to create a measurement report for notifying the occurrence of PLP to the base station. The measurement report creating section 305 creates a measurement report including the measurement result of the component carrier in which PLP occurs and the measurement result of a newly added component carrier and outputs the measurement report to the transmitting section 107. The measurement report creating section 305 may create two measurement reports respectively including the two measurement results.

The other-carrier monitoring mode section 317 measures unused component carriers, using "MeasObject" included in the measurement configuration which is transmitted from the base station in advance. In this case, the other-carrier monitoring mode section 317 temporarily stops the monitoring of the component carrier in which PLP occurs. In this way, it is possible to measure other component carriers, without acquiring a new "Measurement Gap (the period for which the reception of data is temporarily stopped)".

The control section 307 instructs the receiving section 101 to receive, for example, notification information or dedicated control information transmitted from the base station. The control section 307 outputs, to the other-carrier monitoring mode section 317, the measurement configuration based on the dedicated control information which is output from the receiving section 101.

A process when the control section 307 receives an inquiry about the transmission timing of the CQI report, PHR, or the measurement report from the transmitting section 107 is different when the allocation of an uplink is obtained from the receiving section 101 and when the allocation of an uplink is not obtained therefrom. That is, when the uplink is allocated, the control section 307 outputs the timing to the transmitting section 107. When the uplink is not allocated, the control section 307 instructs the transmitting section 107 to transmit a scheduling request to the base station using the radio resources for an uplink control signal which is allocated in advance, such that the uplink is allocated. When the allocation of the uplink is obtained from the receiving section 101, the control section 307 instructs the transmitting section 107 to transmit a buffer status report to the base station. Then, the control section 307 receives the allocation of the uplink from the receiving section 101 and instructs the transmitting section 107 to transmit the CQI report, PHR, or the measurement report.

Operation of Terminal According to Third Embodiment

Figure 8:
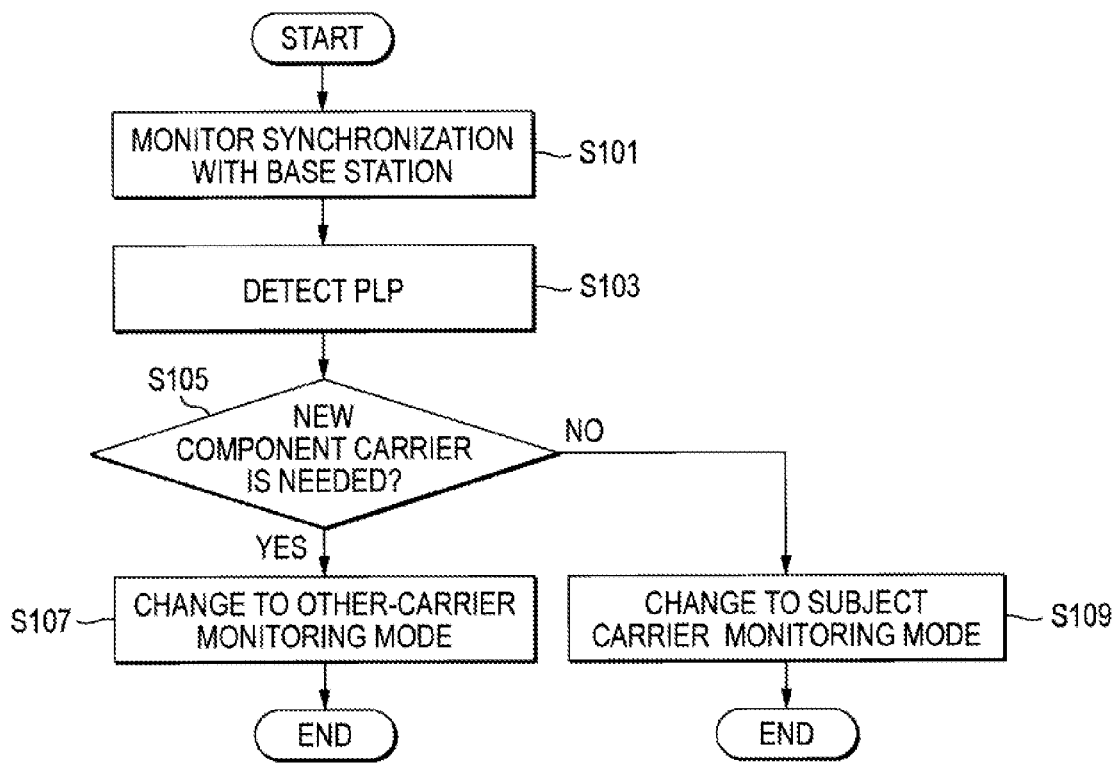
FIG. 8 is a flowchart illustrating the operation of the terminal according to the third embodiment.

FIG. 8 is a flowchart illustrating the operation of the terminal 300 according to the third embodiment. As shown in FIG. 8, the terminal 300 monitors synchronization with the base station for each component carrier which is being used (Step S101). Then, the terminal 300 detects PLP from each component carrier (Step S103). The terminal 300 determines whether to switch the mode of the terminal 300 on the basis of whether a new component carrier is needed (Step S105). When it is determined that a new component carrier is needed, the terminal 300 changes to the other-carrier monitoring mode (Step S107). On the other hand, when it is determined that a new component carrier is not needed, the terminal 300 changes to the subject carrier monitoring mode (Step S109).

When it is determined that a new component carrier is needed, the terminal 300 switches the measurement of the component carrier in which PLP occurs to the measurement of a component carrier with a different carrier frequency. In this way, it is possible to measure the component carrier with an unused carrier frequency, without allocating the "Measurement Gap (the period for which the reception of data is temporarily stopped)". Therefore, it is possible to reduce the consumption of the radio resources and the power consumption of the terminal. When it is determined that a new component carrier is not needed, it is possible to reduce the amount of signaling with the base station. Therefore, it is possible to reduce the amount of radio resources which are unnecessarily allocated.

When the synchronization with the base station is recovered again in the carrier in which PLP occurs, the terminal 300 notifies the recovery of the synchronization to the base station using the measurement report or the CQI report. When the measurement report is used to notify the recovery, the terminal 300 transmits a measurement report including the measurement result of the carrier in which PLP occurs to the base station. When the CQI report is used to notify the recovery, the terminal 300 transmits a CQI report including the carrier in which PLP occurs to the base station. The terminal 300 may determine the recovery of the synchronization with the base station on the basis of whether the signal indicating in-sync is continuously transmitted from the physical layer to the RRC layer a predetermined number of times N311. In addition, the terminal 300 may determine the recovery of the synchronization with the base station using other methods.

Structure of Base Station According to Third Embodiment

Figure 9:
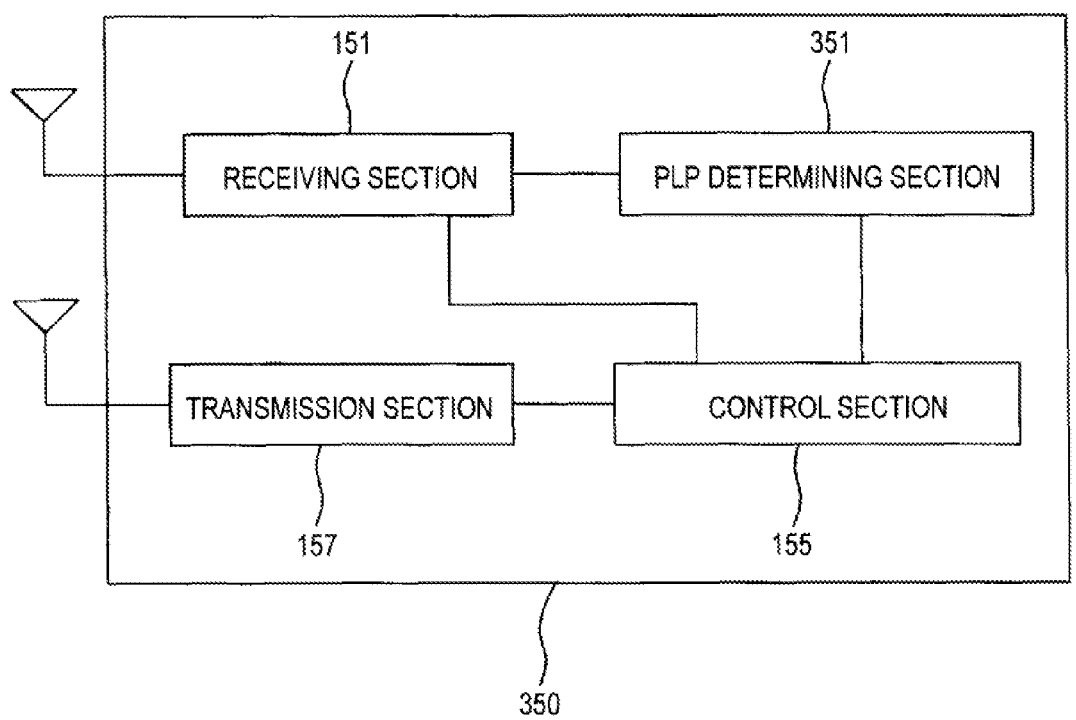
FIG. 9 is a block diagram illustrating a base station forming the wireless communication system according to the third embodiment.

FIG. 9 is a block diagram illustrating the base station forming the wireless communication system according to the third embodiment. As shown in FIG. 9, a base station 350 according to the third embodiment includes a receiving section 151, a PLP determining section 351, a control section 155, and a transmitting section 157. The base station 350 according to this embodiment differs from the base station 150 according to the first embodiment in the structure of the PLP determining section. Therefore, among the components of the base station 350 according to this embodiment, the same components (the receiving section 151, the control section 155, and the transmitting section 157) as those of the base station 150 according to the first embodiment are denoted by the same reference numerals and the detailed description thereof will not be repeated.

When the measurement report is input from the receiving section 151, the PLP determining section 351 determines whether a component carrier with a value indicating the occurrence of PLP is included in the measurement report. When the component carrier with the value indicating the occurrence of PLP is not included in the measurement report, the PLP determining section 351 determines that the measurement report is a normal measurement report and outputs the measurement report to the control section 155. When the component carrier with the value indicating the occurrence of PLP is included in the measurement report, the PLP determining section 351 outputs information related to the component carrier to the control section 155.

When the component carrier with the value indicating the occurrence of PLP is included in the measurement report, the PLP determining section 351 determines whether a component carrier other than the component carrier used by the terminal 300 is included in the measurement report. When the component carrier other than the component carrier used by the terminal 300 is included in the measurement report, the base station 350 determines that the terminal 300 requires the addition of the component carrier.

The PLP determining section 351 instructs the control section 155 to add the component carrier which is included in the measurement report transmitted from the terminal 300. In the case in which the component carrier with the value indicating the occurrence of the PLP is included in the measurement report, even when a component carrier other than the component carrier used by the terminal 300 is included in another measurement report transmitted from the same terminal 300, the base station 350 may determine that the terminal 300 requires the addition of the component carrier. In this case, the PLP determining section 351 instructs the control section 155 to add the component carrier other than the component carrier used by the terminal 300. As such, it is possible to preferentially add the component carrier that the terminal 300 wants to add.

When the CQI report is input from the receiving section 151, the PLP determining section 351 determines whether there is a component carrier which is used by the terminal 300 and is not included in the CQI report. When the component carrier used by the terminal 300 is not included in the CQI report, the PLP determining section 351 determines that PLP occurs in the component carrier. The PLP determining section 351 notifies the control section 155 that PLP has occurred in the component carrier.

In addition, when the component carrier which is determined to have PLP is included in the CQI report input from the receiving section 151, the PLP determining section 351 determines that the synchronization with the base station has been recovered and notifies the recovery of the synchronization to the control section 155. When the measurement result of the component carrier which is determined to have PLP exceeds a value capable of determining that synchronization with the base station has been recovered in the measurement report input from the receiving section 151, the PLP determining section 351 may notify the control section 155 that the measurement result exceeds the value, or it may have the function together with the above-mentioned functions.

When PHR is input from the receiving section 151, the PLP determining section 351 may determine whether PLP occurs on the basis of whether a value or flag indicating the occurrence of PLP is included in PHR. When it is determined that PLP occurs, the PLP determining section 351 notifies the control section 155 that PLP has occurred in the component carrier.

Operation of Base Station According to Third Embodiment

Figure 10:
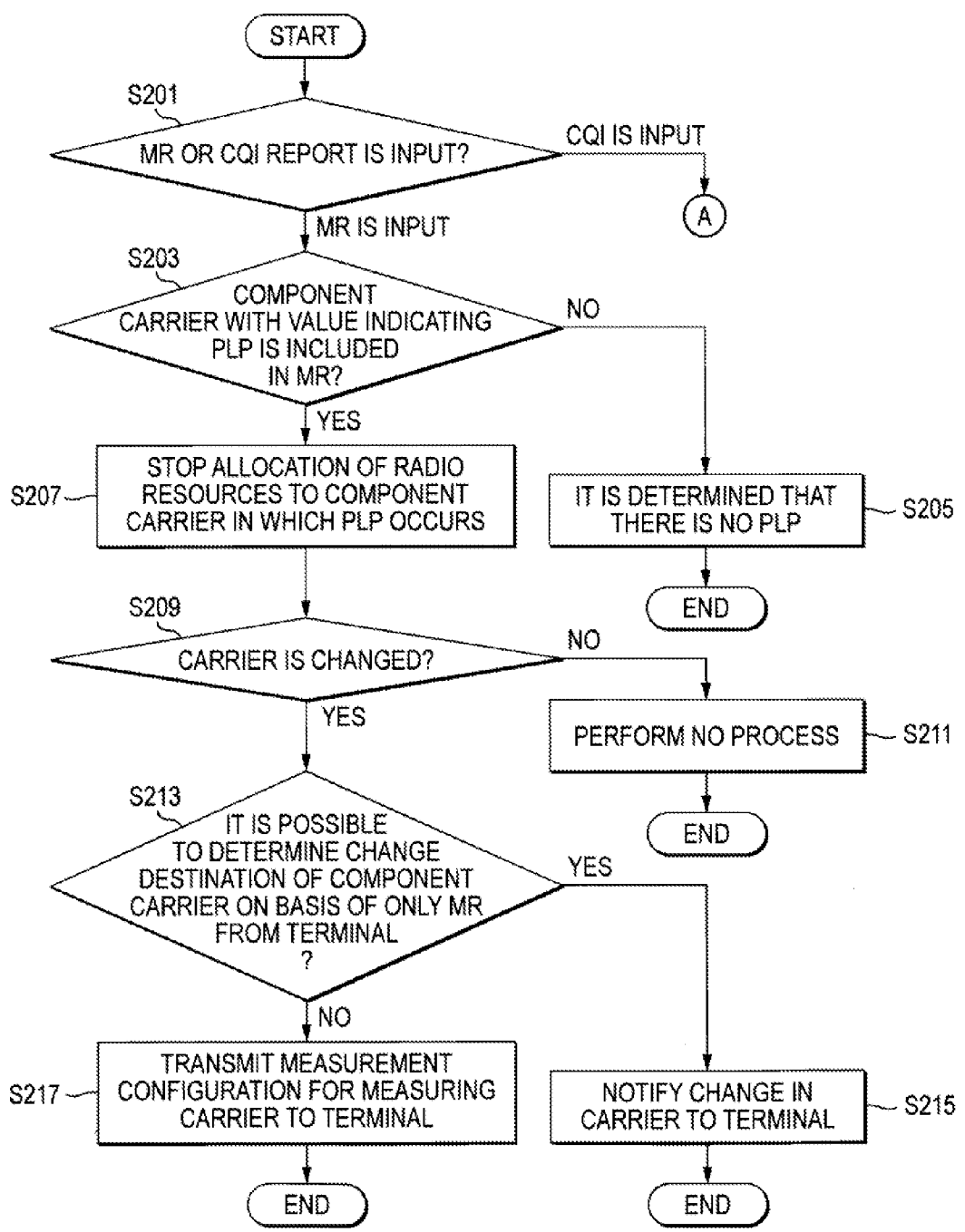
FIG. 10 is a flowchart illustrating the operation of the base station according to the third embodiment.
Figure 11:
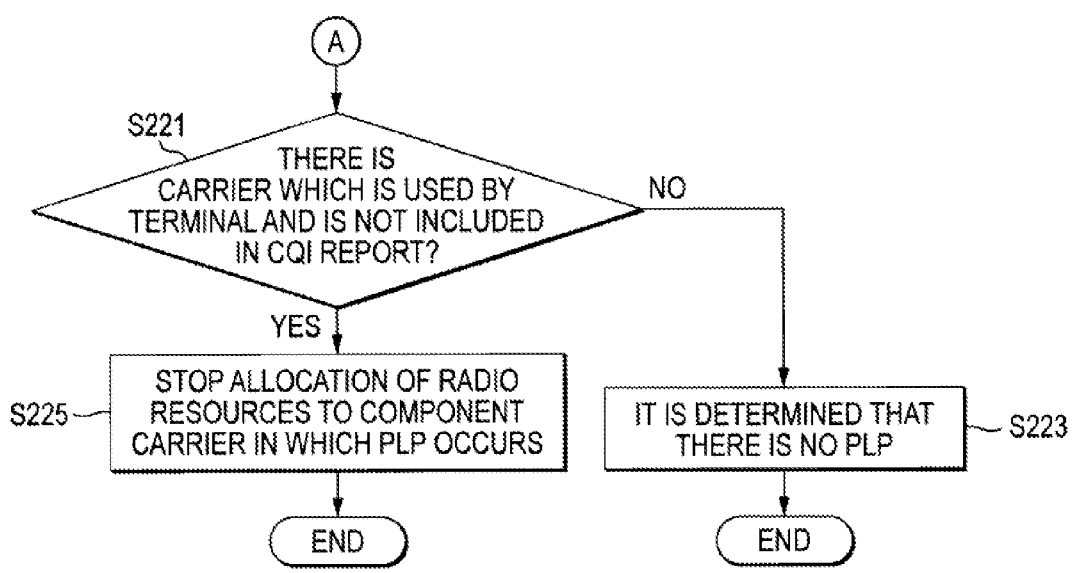
FIG. 11 is a flowchart illustrating the operation of the base station according to the third embodiment.

FIGS. 10 and 11 are flowcharts illustrating the operation of the base station 350 according to the third embodiment. As shown in FIG. 10, the base station 350 determines whether the measurement report (MR) or the CQI report is input (Step S201). When the measurement report is input, the base station 350 determines whether the cell including the component carrier with a value indicating the occurrence of PLP is included in the measurement report (Step S203). When the cell including the component carrier which has a value indicating the occurrence of PLP and is used by the terminal is not included in the measurement report, the base station 350 determines that no PLP occurs (Step S205).

When the cell including the component carrier with a value indicating the occurrence of PLP is included in the measurement report, the base station 350 temporarily stops the allocation of the radio resources to the component carrier (Step S207). The base station 350 determines whether to change the component carrier (Step S209). When it is determined that the component carrier is not changed, the base station 350 does not perform any process (Step S211).

When it is determined that the component carrier is changed, the base station 350 determines whether the change destination of the component carrier can be determined on the basis of only the information of the measurement report transmitted from the terminal 300 (Step S213). When the change destination of the component carrier can be determined on the basis of only the information of the measurement report transmitted from the terminal 300, the base station 350 notifies a change in the component carrier to the terminal (Step S215). On the other hand, when the change destination of the component carrier cannot be determined on the basis of only the information of the measurement report transmitted from the terminal 300, the base station 350 transmits measurement configuration for measuring the component carrier to the terminal 300 (Step S217).

When the CQI report is input, the base station 350 determines whether there is a component carrier which is used by the terminal 300 and is not included in the CQI report, as shown in FIG. 11 (Step S221). When there is no component carrier which is used by the terminal 300 and is not included in the CQI report, that is, when all of the component carriers used by the terminal 300 are included in the CQI report, the base station 350 determines that no PLP occurs (Step S223). On the other hand, when there is a component carrier which is used by the terminal 300 and is not included in the CQI report, the base station 350 determines that PLP occurs and does not allocate the radio resources to the component carrier (Step S225).

When the measurement report or the CQI report including the component carrier which is determined to have PLP is received and it is determined that synchronization with the terminal 300 is recovered on the basis of the report, the base station 350 starts the allocation of the radio resources to the recovered component carrier.

Fourth Embodiment

A wireless communication system according to a fourth embodiment will be described. The wireless communication system according to the fourth embodiment includes terminals and the base station provided in the wireless communication system according to the third embodiment.

In the wireless communication system according to the fourth embodiment, the terminal has a function of receiving a reference signal which is transmitted from the base station to each cell using a downlink and reporting the measurement result calculated by a predetermined computation expression as a measurement report to the base station using an uplink. In addition, the terminal has a function of receiving the reference signal transmitted from the base station to each cell according to a CQI report configuration using the downlink and transmitting a CQI report to the base station using the uplink.

The base station serves as an access point of a radio access network for terminals and allocates and manages the radio resources (for example, a frequency band in a frequency region or a time region). In addition, the base station has a function of performing a handover process or a component carrier change process when it is determined that handover to another cell or a change in the component carrier is needed on the basis of the measurement report transmitted from the terminal.

Structure of Terminal According to Fourth Embodiment

Figure 12:
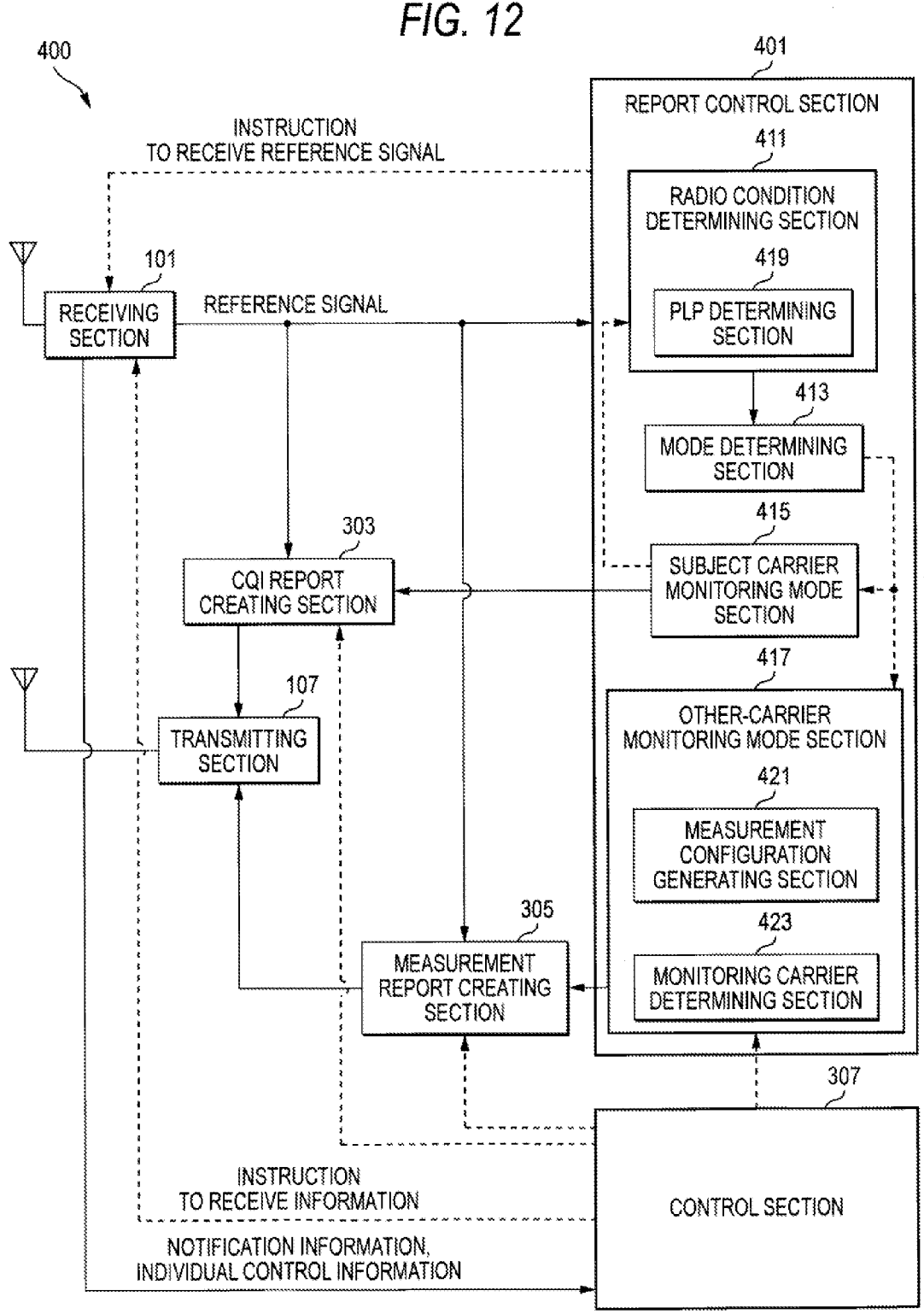
FIG. 12 is a block diagram illustrating a terminal forming a wireless communication system according to a fourth embodiment.

FIG. 12 is a block diagram illustrating a terminal forming the wireless communication system according to the fourth embodiment. As shown in FIG. 12, a terminal 400 according to the fourth embodiment includes a receiving section 101, a report control section 401, a CQI report creating section 303, a measurement report creating section 305, a control section 307, and a transmitting section 107. The terminal 400 according to this embodiment differs from the terminal 300 according to the third embodiment in the structure of an other-carrier monitoring mode section of the report control section 401. Therefore, among the components of the terminal 400 according to this embodiment, the same components (the receiving section 101, the CQI report creating section 303, the measurement report creating section 305, the control section 307, and the transmitting section 107) as those of the terminal 300 according to the third embodiment are denoted by the same reference numerals and the detailed description thereof will not be repeated.

Similarly to the report control section 301 according to the third embodiment, the report control section 401 includes a radio condition determining section 411, a mode determining section 413, a subject carrier monitoring mode section 415, and an other-carrier monitoring mode section 417. The radio condition determining section 411 has the same function as the radio condition determining section 311 according to the third embodiment. The mode determining section 413 has the same function as the mode determining section 313 according to the third embodiment. The subject carrier monitoring mode section 415 has the same function as the subject carrier monitoring mode section 315 according to the third embodiment. The other-carrier monitoring mode section 417 includes a measurement configuration generating section 421 and a monitoring carrier determining section 423 in addition to the function of the other-carrier monitoring mode section 317 according to the third embodiment.

When component carrier information is input from the other-carrier monitoring mode section 417 and the measurement configuration generating section 421 is instructed to generate the measurement configuration of the component carrier indicated by the information, the measurement configuration generating section 421 generates the measurement configuration of the component carrier. The measurement configuration generating section 421 outputs the generated measurement configuration to the other-carrier monitoring mode section 417.

The measurement configuration generating section 421 generates the measurement configuration of the component carrier using the following methods.

A first example is a method of generating the measurement configuration on the basis of measurement configuration set to the anchor carrier.

A second example is a method of generating the measurement configuration on the basis of the measurement configuration of a component carrier in which PLP occurs. When the component carrier in which PLP occurs is an extension carrier and there is no measurement configuration, a method may be used which generates the measurement configuration on the basis of the measurement configuration of a component carrier which is used as a set with the extension carrier.

A third example is a method of generating the measurement configuration on the basis of another component carrier within the same frequency band as that including the component carrier which generates the measurement configuration.

A fourth example is a method of generating the measurement configuration on the basis of the measurement configuration of a backward compatible carrier or a non-backward compatible carrier which forms a set with the extension carrier when the extension carrier is measured.

A fifth example is the following method: when a backward compatible carrier is measured, the measurement configuration set to another backward compatible carrier is used; when a non-backward compatible carrier is measured, the measurement configuration set to another non-backward compatible carrier is used; and when an extension carrier is measured, the measurement configuration set to another extension carrier is used.

The above-mentioned examples may be combined with each other, or methods other than the above-mentioned methods may be used to generate the measurement configuration. As such, the terminal 400 can measure the component carrier which does not have a measurement configuration, without receiving a new measurement configuration from the base station. The reason is as follows. When a different carrier frequency is measured, instead of monitoring the component carrier in which PLP occurs, it is not necessary to receive a new "Measurement Gap (the period for which the reception of data is temporarily stopped)".

The monitoring carrier determining section 423 determines the component carrier to be measured, on the basis of information input from the other-carrier monitoring mode section 417. The monitoring carrier determining section 423 determines a component carrier which can be used instead of the component carrier in which PLP occurs. The monitoring carrier determining section 423 outputs the determined component carrier to the report control section 401. When information indicating that the determined component carrier cannot be used is input from the report control section 401, the monitoring carrier determining section 423 determines another component carrier which can be used instead of the component carrier in which PLP occurs and outputs the determined component carrier to the report control section 401.

There are some conditions for determining the component carrier which can be used instead of the component carrier in which PLP occurs.

As the first condition, an unused component carrier can be used.

As the second condition, when PLP occurs in the anchor carrier, a component carrier which is usable as the anchor carrier can be used.

As the third condition, when the component carriers belonging to different frequency bands are used, a component carrier belonging to a frequency band different from the frequency band including the component carrier in which PLP occurs can be used.

As the fourth condition, when PLP occurs in a backward compatible carrier or a non-backward compatible carrier, a component carrier, such as the backward compatible carrier or the non-backward compatible carrier, can be used.

As the fifth condition, a component carrier that is easy to set can be used. For example, when PLP occurs in an extension carrier, a component carrier, such as the backward compatible carrier which is used as a set with the extension carrier or another extension carrier which is used as a set with the non-backward compatible carrier, can be used. In addition, for example, a component carrier capable of obtaining frequency information can be used.

As the sixth condition, a component carrier which can be used simultaneously with the component carrier which is being used can be used.

As the seventh condition, among the configured component carriers, a deactivated component carrier can be used. In this way, only the operation of the base station notifying activation to the terminal enables the terminal to start the use of the component carrier. Therefore, it is possible to rapidly start the use of the component carrier, as compared to other component carriers. In addition, since the base station does not transmit the configuration information of the component carrier, it is possible to reduce the amount of radio resources used by a value corresponding to the configuration information.

In addition, measurement may be performed from the component carrier satisfying all of the above-mentioned conditions or the component carrier satisfying some of the above-mentioned conditions. When the component carrier to be measured is limited in this way, it is possible to reduce the time required to measure the component carrier. In addition, when the component carrier replacing the component carrier in which PLP occurs is selected as represented in the above-mentioned conditions, it is easy to maintain QoS (Quality of Service) before PLP occurs.

When the measurement configuration of the component carrier is input from the monitoring carrier determining section 423, the other-carrier monitoring mode section 417 performs measurement using the measurement configuration. When the measurement configuration of the component carrier is not input from the monitoring carrier determining section 423, the other-carrier monitoring mode section 417 instructs the measurement configuration generating section 421 to generate the measurement configuration of the component carrier.

The other-carrier monitoring mode section 417 determines whether the component carrier can be used, on the basis of the measurement result of the component carrier input from the monitoring carrier determining section 423. When it is determined that the component carrier cannot be used on the basis of the measurement result of the component carrier, the other-carrier monitoring mode section 417 outputs information indicating that the component carrier cannot be used to the monitoring carrier determining section 423. When it is determined that the component carrier can be used on the basis of the measurement result of the component carrier, the other-carrier monitoring mode section 417 instructs the measurement report creating section 305 to generate a measurement report including the measurement result of the component carrier and the measurement result of the component carrier in which PLP occurs. The measurement report creating section 305 may generate two measurement reports respectively including the two measurement results.

Fifth Embodiment

A wireless communication system according to a fifth embodiment will be described. The wireless communication system according to the fifth embodiment includes terminals and the base station provided in the wireless communication system according to the third embodiment.

In the wireless communication system according to the fifth embodiment, the terminal has a function of receiving a reference signal transmitted from the base station to each cell using a downlink and reporting the measurement result calculated by a predetermined computation expression as a measurement report to the base station using an uplink. In addition, the terminal has a function of receiving the reference signal transmitted from the base station to each cell according to a CQI report configuration using the downlink and transmitting a CQI report to the base station using the uplink.

The base station serves as an access point of a radio access network for terminals and allocates and manages the radio resources (for example, a frequency band in a frequency region or a time region). In addition, the base station has a function of performing a handover process or a component carrier change process when it is determined that handover to another cell or a change in the component carrier is needed on the basis of the measurement report transmitted from the terminal.

Structure of Terminal According to Fifth Embodiment

Figure 13:
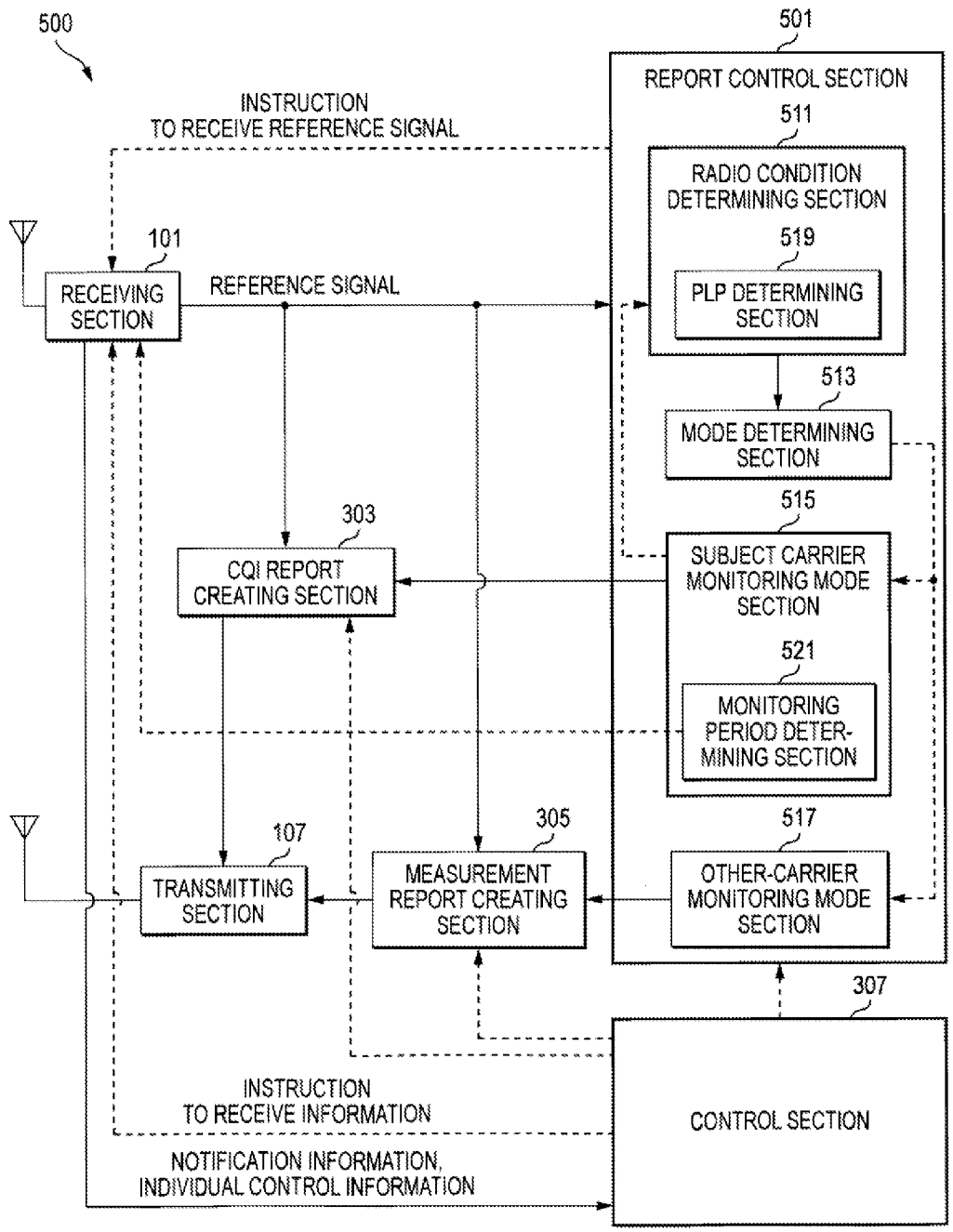
FIG. 13 is a block diagram illustrating a terminal forming a wireless communication system according to a fifth embodiment.

FIG. 13 is a block diagram illustrating the terminal forming the wireless communication system according to the fifth embodiment. As shown in FIG. 13, a terminal 500 according to the fifth embodiment includes a receiving section 101, a report control section 501, a CQI report creating section 303, a measurement report creating section 305, a control section 307, and a transmitting section 107. The terminal 500 according to this embodiment differs from the terminal 300 according to the third embodiment in the structure of a subject carrier monitoring mode section of the report control section. Therefore, among the components of the terminal 500 according to this embodiment, the same components (the receiving section 101, the CQI report creating section 303, the measurement report creating section 305, the control section 307, and the transmitting section 107) as those of the terminal 300 according to the third embodiment are denoted by the same reference numerals and the detailed description thereof will not be repeated.

Similarly to the report control section 301 according to the third embodiment, the report control section 501 includes a radio condition determining section 511, a mode determining section 513, a subject carrier monitoring mode section 515, and an other-carrier monitoring mode section 517. The radio condition determining section 511 has the same function as the radio condition determining section 311 according to the third embodiment. The mode determining section 513 has the same function as the mode determining section 313 according to the third embodiment. The other-carrier monitoring mode section 517 has the same function as the other-carrier monitoring mode section 317 according to the third embodiment. The subject carrier monitoring mode section 515 includes a monitoring period determining section 521 in addition to the function of the subject carrier monitoring mode section 315 according to the third embodiment.

The monitoring period determining section 521 determines a monitoring period on the basis of the conditions of the component carrier used by the terminal 500. For the monitoring period, the receiving section 101 receives a reference signal in order to check whether the terminal 500 is synchronized with the base station. When the monitoring period increases, that is, when the period for which the reference signal is not received increases, the terminal 500 does not try to receive the reference signal, which is preferable. Therefore, it is possible to reduce power consumption.

In a monitoring period determining method of the monitoring period determining section 521, the monitoring period increases when the conditions of a reference component carrier are bad, and the monitoring period decreases when the conditions of the reference component carrier are good. For example, there is the following method: a reference period is stored in advance; when the conditions of the reference component carrier are bad, a period that is x times (x is a real number) longer than the reference period is used as a monitoring period; and, when the conditions of the reference component carrier are good, the reference period is used as the monitoring period. In addition, for example, the following method is considered. In the case in which discontinuous reception (DRX) is set, when the conditions of the reference component carrier are bad, a period that is y times (y is a real number) longer than the period set by DRX is used as the monitoring period. When the conditions of the reference component carrier are good, the period set by DRX is used as the monitoring period.

There are some candidates for the reference component carrier.

The first example is a component carrier in which PLP occurs.

The second example is an anchor carrier.

The third example is a backward compatible carrier adjacent or close to the component carrier in which PLP occurs. In addition, the third example may be a non-backward compatible carrier.

The fourth example is a component carrier belonging to the same frequency band as that including the component carrier in which PLP occurs.

In addition, the above-mentioned examples may be combined with each other and the reference component carrier may be selected by methods other than the above-mentioned examples.

Sixth Embodiment

A wireless communication system according to a sixth embodiment will be described. The wireless communication system according to the sixth embodiment includes terminals and base stations.

In the wireless communication system according to the sixth embodiment, the terminal has a function of receiving a reference signal transmitted from the base station to each cell using a downlink and reporting the measurement result calculated by a predetermined computation expression as a measurement report to the base station using an uplink. In addition, the terminal has a function of receiving the reference signal transmitted from the base station to each cell according to a CQI report configuration using the downlink and transmitting a CQI report to the base station using the uplink.

The base station serves as an access point of a radio access network for terminals and allocates and manages the radio resources (for example, a frequency band in a frequency region or a time region). In addition, the base station has a function of performing a handover process or a component carrier change process when it is determined that handover to another cell or a change in the component carrier is needed on the basis of the measurement report transmitted from the terminal.

Structure of Terminal According to Sixth Embodiment

Figure 14:
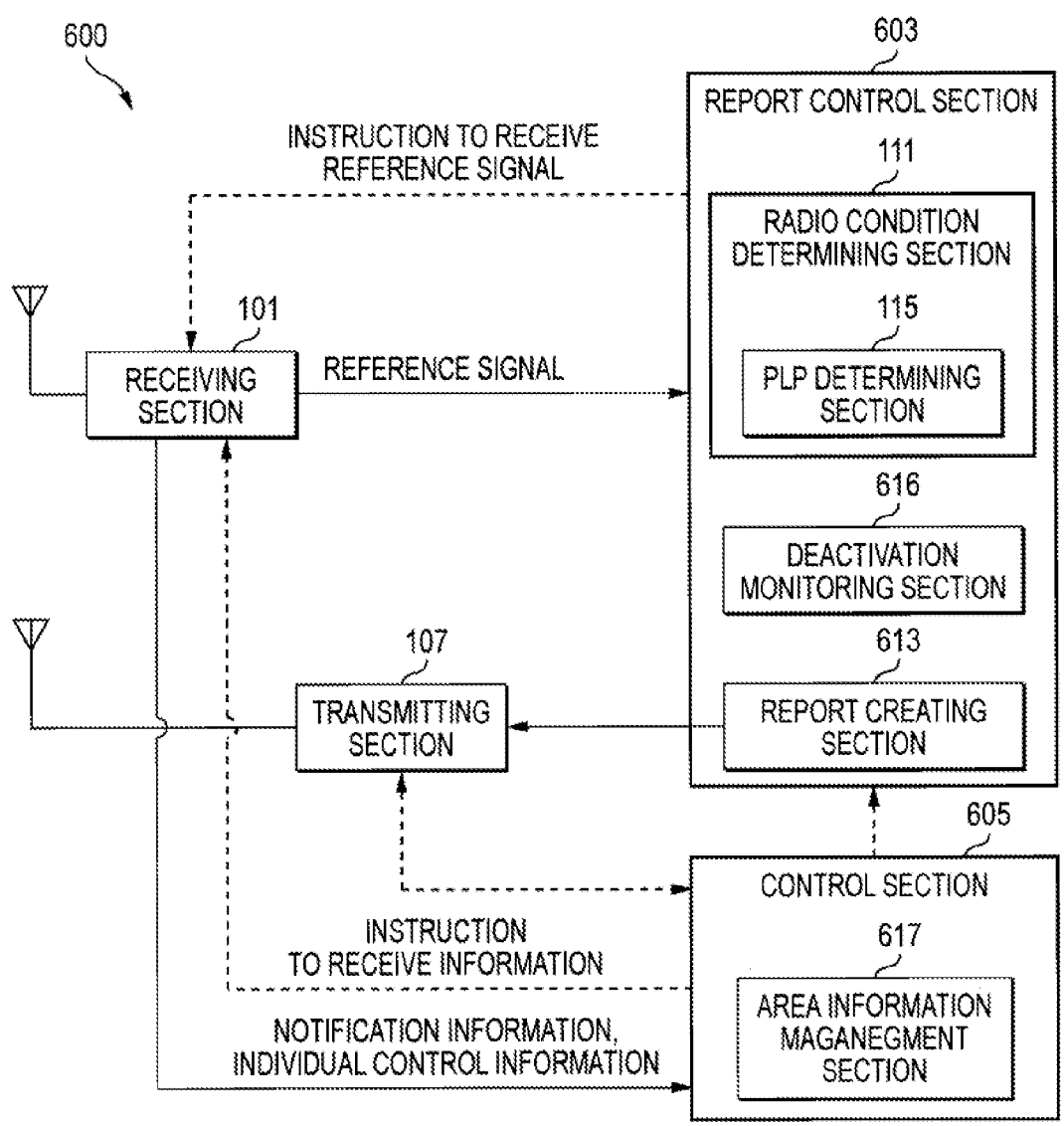
FIG. 14 is a block diagram illustrating a terminal forming a wireless communication system according to a sixth embodiment.

FIG. 14 is a block diagram illustrating the terminal forming the wireless communication system according to the sixth embodiment. As shown in FIG. 14, a terminal 600 according to the sixth embodiment includes a receiving section 101, a report control section 603, a control section 605, and a transmitting section 107. The terminal 600 according to this embodiment differs from the terminal 100 according to the first embodiment in the structure of a deactivation monitoring section 616 and a report creating section 613 of the report control section 603 and the structure of an area information management section 617 of the control section 605. Therefore, among the components of the terminal 600 according to this embodiment, the same components (the receiving section 101 and the transmitting section 107) as those of the terminal 100 according to the first embodiment are denoted by the same reference numerals and the detailed description thereof will not be repeated.

The control section 605 has the following functions in addition to the function of the control section 105 according to the first embodiment. When receiving an instruction to deactivate the component carrier, the control section 605 deactivates the component carrier. In this case, the control section 605 notifies the deactivation monitoring section 616 of the report control section 603 that the component carrier has been deactivated. On the other hand, when receiving an instruction to activate the component carrier, the control section 605 activates the component carrier. In this case, the control section 605 notifies the deactivation monitoring section 616 of the report control section 603 that the component carrier has been activated.

The control section 605 includes the area information management section 617. The area information management section 617 manages whether the size of the cell in which the terminal 600 is used is large or small on the basis of information about the size of the cell included in notification information transmitted from the base station, and outputs the information to the deactivation monitoring section 616 of the report control section 603. There are some methods of classifying the size of the cell. A first example is a method of classifying the size of the cell into two stages, that is, a large size and a small size using one bit. A second example is a method of classifying the size of the cell into three stages, that is, a large size, a medium size, and a small size using two bits. A third example is a method of classifying the size of the cell into four stages, that is, sizes 1, 2, 3, and 4 using two bits. A fourth example is a method of classifying the size of the cell into 5 to 8 stages using three bits. In addition, the other methods may be used.

The report control section 603 includes a radio condition determining section 111, the deactivation monitoring section 616, and the report creating section 613. The radio condition determining section 111 has the same structure as that according to the first embodiment.

When a notice indicating that the component carrier has been deactivated or activated is received from the control section 605, the deactivation monitoring section 616 manages the information related to the deactivation or the activation. In addition, the deactivation monitoring section 616 selects one deactivated component carrier in which the measurement of a component carrier frequency is configured among the deactivated component carriers and monitors the component carrier.

Figure 15:
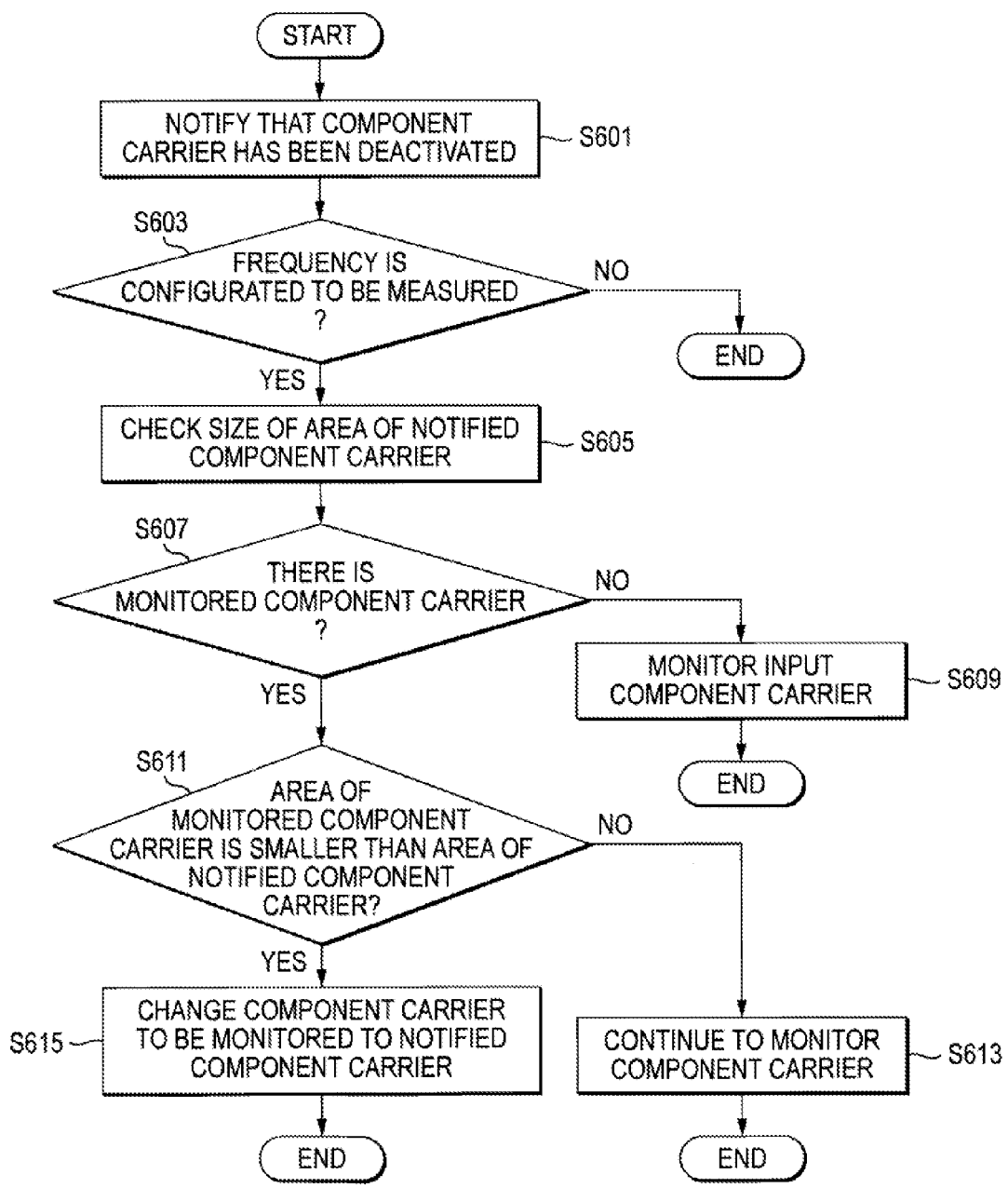
FIG. 15 is a flowchart illustrating the operation of a deactivation monitoring section 616 when a notice indicating that a component carrier has been deactivated is received.

FIG. 15 is a flowchart illustrating the operation of the deactivation monitoring section 616 when a notice indicating that the component carrier has been deactivated is received. As shown in FIG. 15, when a notice indicating that the component carrier has been deactivated is received the control section 605 (Step S601), the deactivation monitoring section 616 determines whether the frequency of the component carrier is a component carrier frequency which is configured to be measured (Step S603). When the frequency of the component carrier is not the component carrier frequency which is configured to be measured (NO in Step S603), the deactivation monitoring section 616 ends the process. When the frequency of the component carrier is the component carrier frequency which is configured to be measured (YES in Step S603), the deactivation monitoring section 616 checks the size of the deactivated component carrier (Step S605).

Then, the deactivation monitoring section 616 checks whether there is a component carrier which is being monitored (Step S607). When there is no component carrier which is being monitored (NO in Step S607), the deactivation monitoring section 616 monitors the component carrier (hereinafter, referred to as a "notified component carrier") notified in Step S601 (Step S609). On the other hand, when there is a component carrier which is being monitored (YES in Step S607), the deactivation monitoring section 616 determines whether the size of the component carrier which is being monitored is less than that of the area of the notified component carrier (Step S611).

When the size of the area of the component carrier which is being monitored is equal to or more than that of the area of the notified component carrier (NO in Step S611), the deactivation monitoring section 616 continuously monitors the component carrier which is being monitored (Step S613). On the other hand, when the size of the component carrier which is being monitored is less than that of the area of the notified component carrier (YES in Step S611), the deactivation monitoring section 616 changes the component carrier to be monitored to the notified component carrier (Step S615).

When the sizes of the areas of the two component carriers are equal to each other, the deactivation monitoring section 616 may monitor these component carriers at the same time. When the state of the component carrier which is being monitored is good, the deactivation monitoring section 616 notifies the state to the report creating section 613 of the report control section 603.

Figure 16:
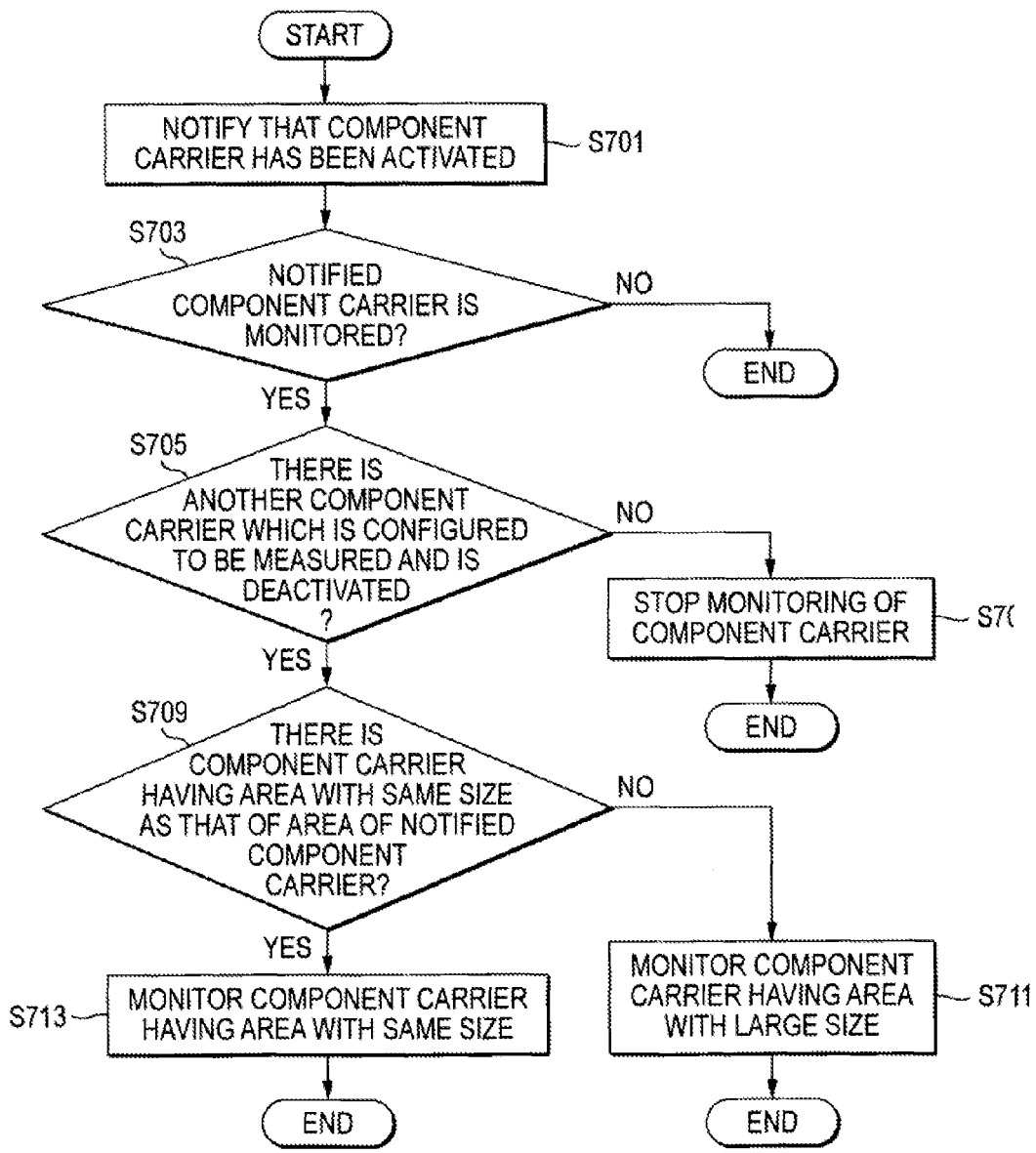
FIG. 16 is a flowchart illustrating the operation of the deactivation monitoring section 616 when a notice indicating that the component carrier has been activated is received.

FIG. 16 is a flowchart illustrating the operation of the deactivation monitoring section 616 when a notice indicating that the component carrier has been activated is received. As shown in FIG. 16, when a notice indicating that the component carrier has been activated is received from the control section 605 (Step S701), the deactivation monitoring section 616 determines whether the notified component carrier is monitored (Step S703). When the notified component carrier is not monitored (NO in Step S703), the deactivation monitoring section 616 ends the process. On the other hand, when the notified component carrier is monitored (YES in Step S703), the deactivation monitoring section 616 determines whether there are other component carriers which are configured to be measured and are deactivated (Step S705).

When there are no other component carriers which is configured to be measured and is deactivated (NO in Step S705), the deactivation monitoring section 616 stops the monitoring of the component carrier (Step S707). When there are other component carriers which are configured to be measured and are deactivated (YES in Step S705), the deactivation monitoring section 616 determines whether there is a component carrier which has an area with the same size as that of the area of the component carrier notified in Step S701, is configured to be measured, and is deactivated (Step S709).

When there is no component carrier which has an area with the same size as that of the area of the notified component carrier, is configured to be measured, and is deactivated (NO in Step S709), the deactivation monitoring section 616 stops the monitoring of the notified component carrier, selects one component carrier having an area with a large size among the component carriers which are configured to be measured and are deactivated, and monitors the selected component carrier (Step S711). When there is a component carrier which has an area with the same size as that of the area of the notified component carrier, is configured to be measured, and is deactivated (YES in Step S709), the deactivation monitoring section 616 stops the monitoring of the notified component carrier and monitors the component carrier which has an area with the same size, is configured to be measured, and is deactivated (Step S713).

When there are a plurality of component carriers which have an area with the same size, are configured to be measured, and are deactivated, the deactivation monitoring section 616 may monitors all the component carriers. Furthermore, in addition to the monitoring of the component carriers having the areas with the same size, the deactivation monitoring section 616 may select only one component carrier with a large area from the other component carriers which are configured to be measured and are deactivated and also monitor the selected component carrier. In this case, when there are a plurality of component carriers which are configured to be measured, are deactivated, and have areas with the same size, the deactivation monitoring section 616 selects one of the component carriers.

As such, since the deactivation monitoring section 616 monitors the component carrier on the basis of the size of the area, it is possible to reduce the monitoring of the component carrier which is less likely to be recovered. In addition, when the measurement configuration of the deactivated component carrier which is being monitored is removed, the deactivation monitoring section 616 changes the component carrier to be monitored to a component carrier with a large area among the component carriers which are configured to be measured and are deactivated.

The report creating section 613 has the following functions, in addition to the function of the report creating section 113 according to the first embodiment. When receiving a notice indicating that the state of the component carrier has been recovered from the deactivation monitoring section 616, the report creating section 613 creates a measurement report of the component carrier. The report creating section 613 may create a CQI report including the CQI of the component carrier whose state has been recovered, instead of the measurement report. The report creating section 613 outputs the created measurement report or CQI report to the transmitting section 107.

Structure of Base Station According to Sixth Embodiment

Figure 17:
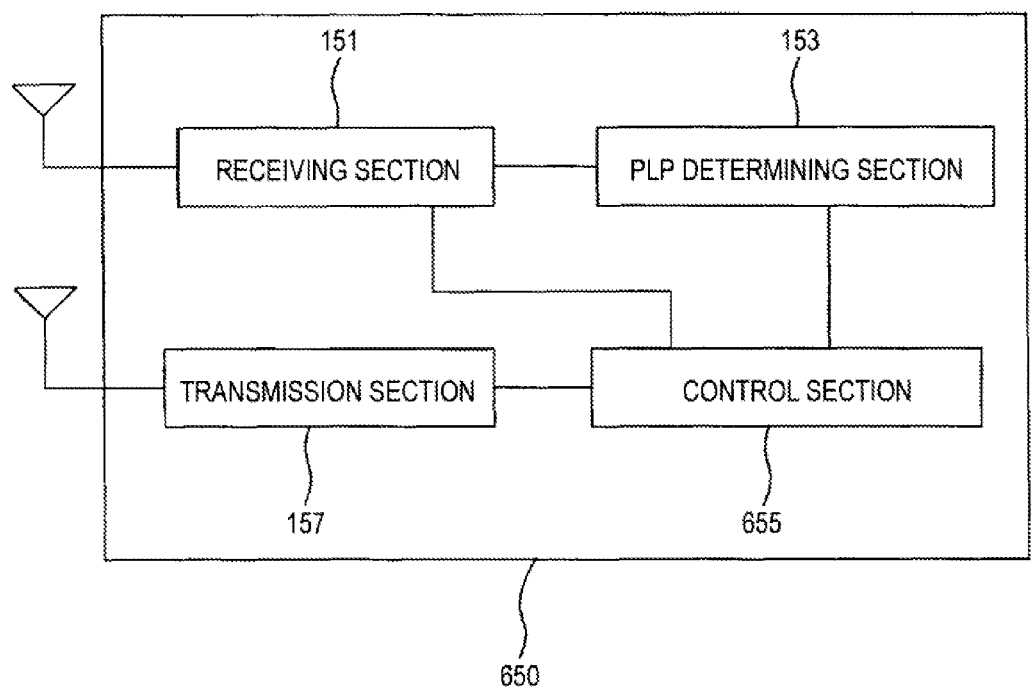
FIG. 17 is a block diagram illustrating a base station forming the wireless communication system according to the sixth embodiment.
Figure 18:
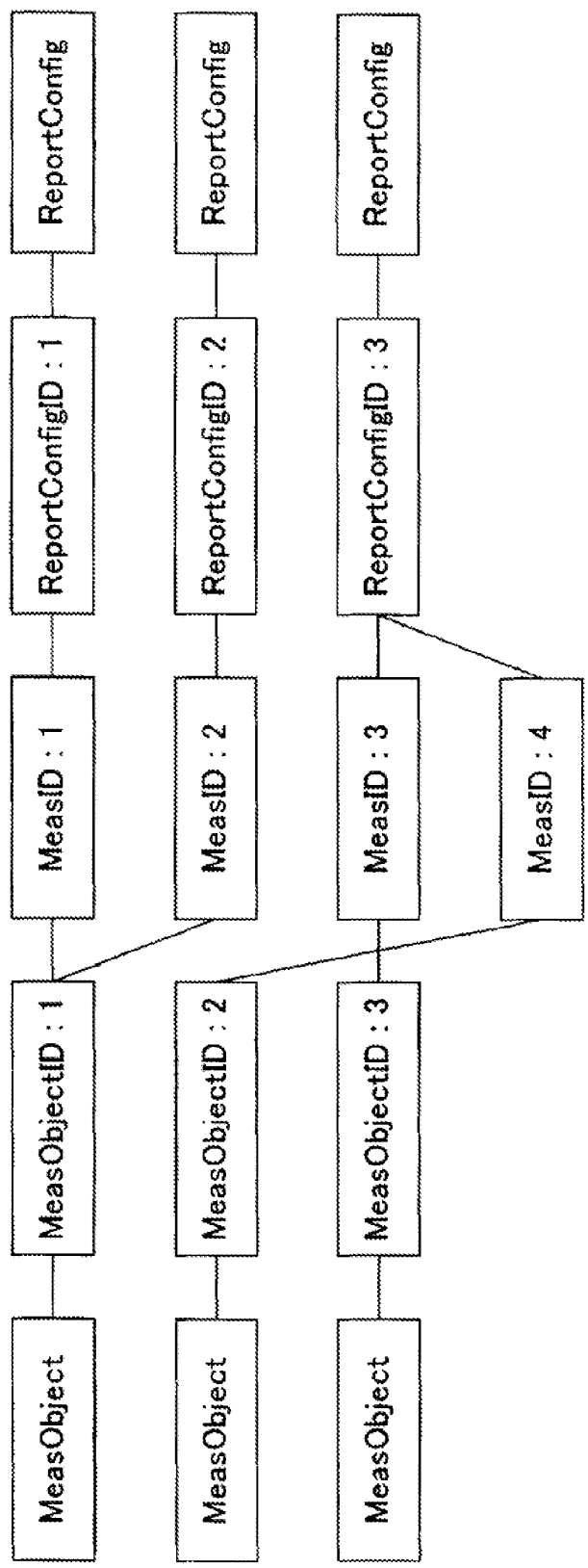
FIG. 18 is a diagram illustrating an example of measurement configuration.
Figure 19:
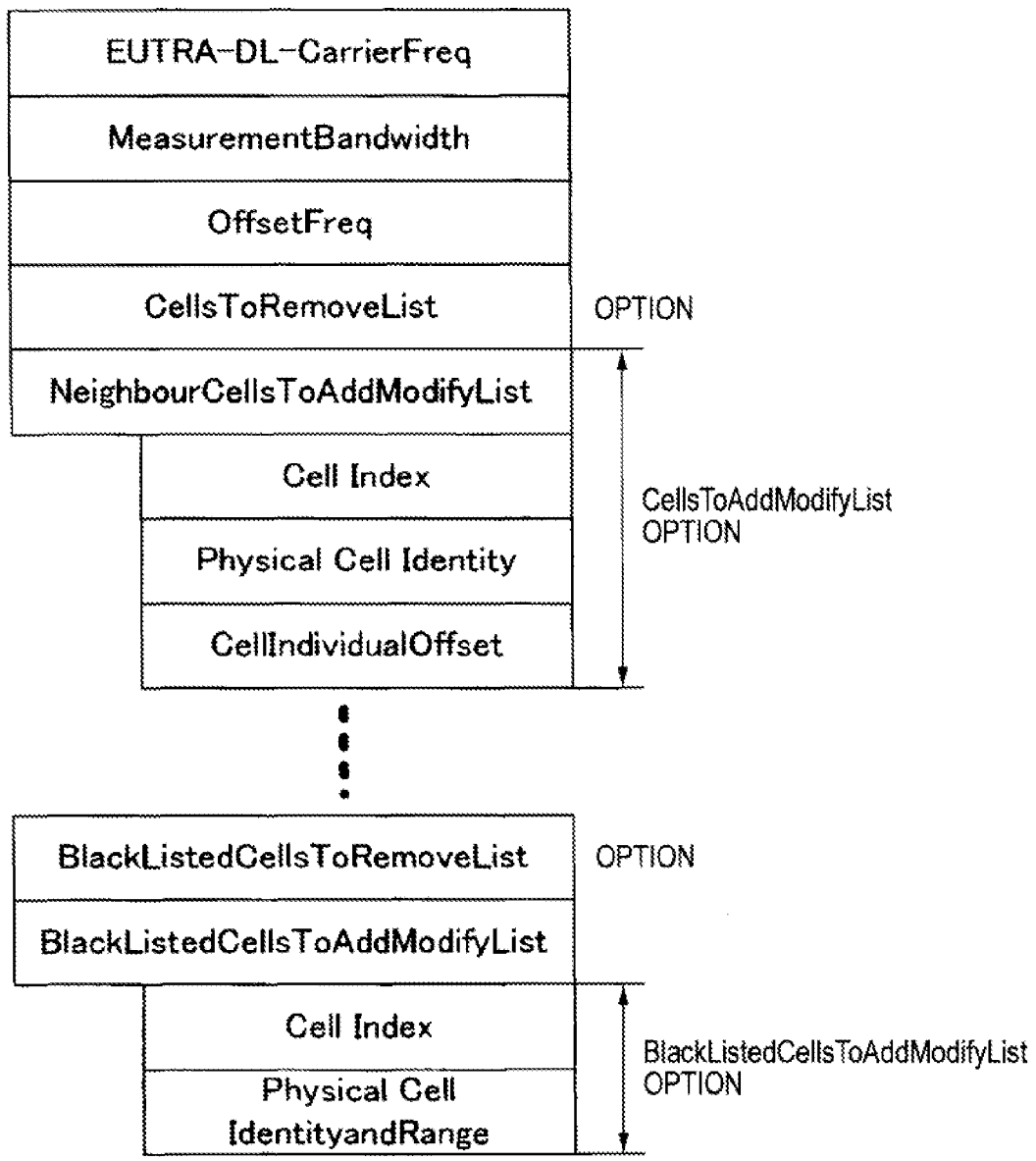
FIG. 19 is a diagram illustrating an example of a measurement object (MeasObject).
Figure 20:
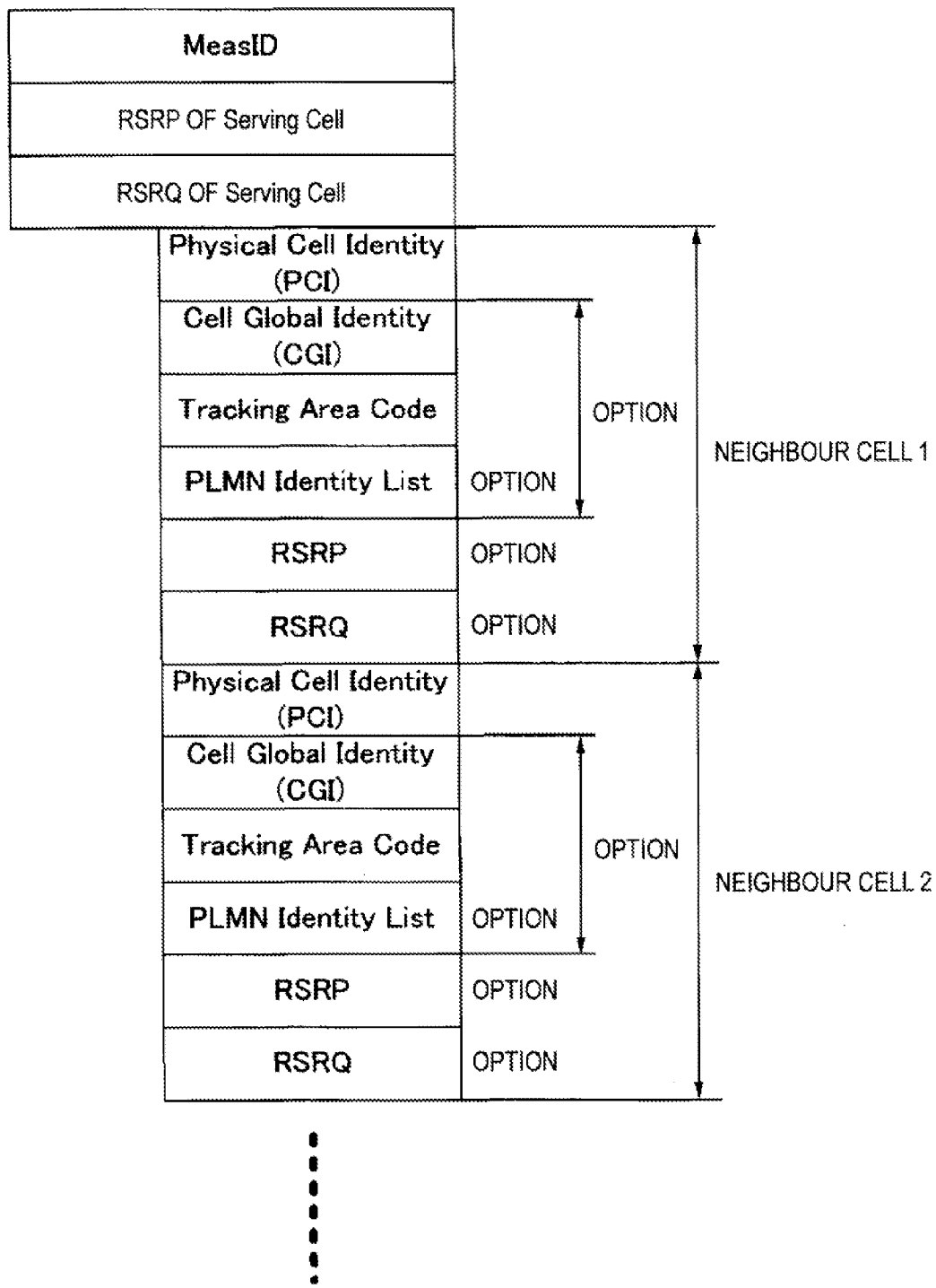
FIG. 20 is a diagram illustrating an example of a measurement report (MR).
Figure 21:
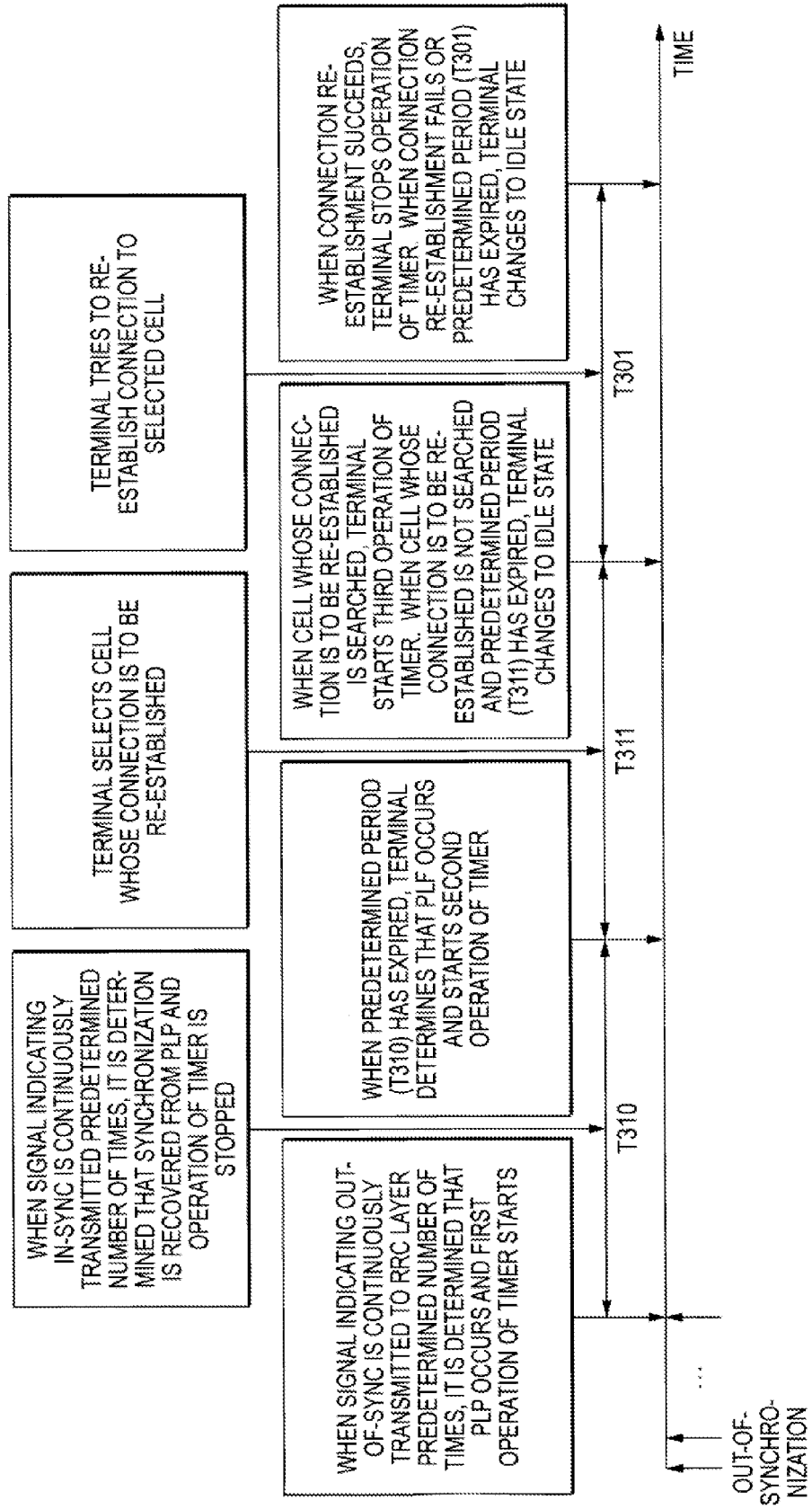
FIG. 21 is a flowchart when a terminal determines that PLP (Physical Layer Problem) or RLF (Radio Link Failure) occurs.
Figure 22:
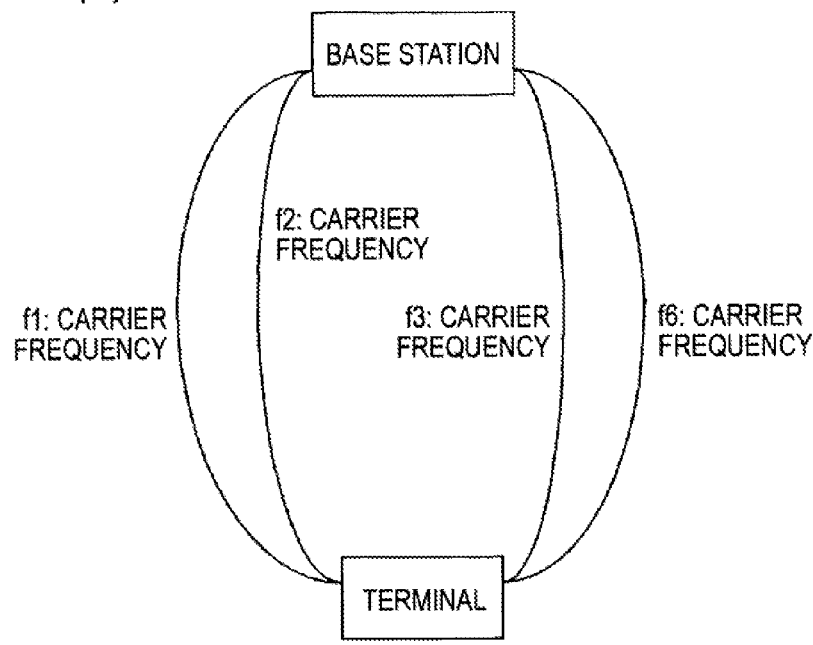
FIGS. 22(a) and 22(b) are diagrams illustrating an example of carrier aggregation.
Figure 22:
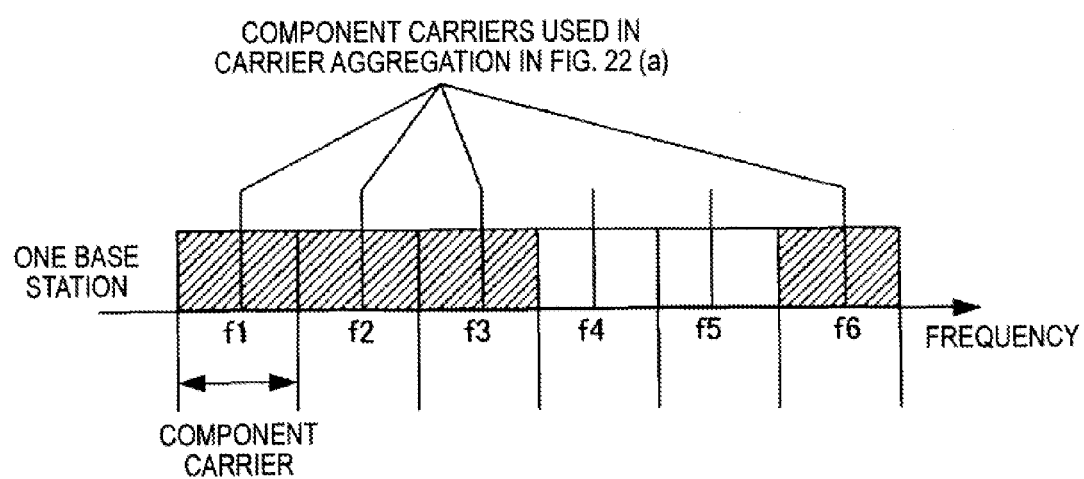

FIG. 17 is a block diagram illustrating the base station forming the wireless communication system according to the sixth embodiment. As shown in FIG. 17, a base station 650 according to the sixth embodiment includes a receiving section 151, a PLP determining section 153, a control section 655, and a transmitting section 157. The base station 650 according to this embodiment differs from the base station 150 according to the first embodiment in the structure of the control section. Therefore, among the components of the base station 650 according to this embodiment, the same components (the receiving section 151, the PLP determining section 153, and the transmitting section 157) as those of the base station 150 according to the first embodiment are denoted by the same reference numerals and the detailed description thereof will not be repeated.

The control section 655 has the following functions, in addition to the function of the control section 155 according to the first embodiment. When the allocation of radio resources to the component carrier is temporarily stopped, the control section 655 outputs a control signal indicating deactivation to be transmitted to the terminal 600 to the transmitting section 157. When the allocation of radio resources to the component carrier starts, the control section 655 outputs a control signal indicating activation to be transmitted to the terminal 600 to the transmitting section 157.

The control section 655 may instruct the transmitting section 157 to transmit the control signal indicating deactivation or activation using PDCCH (Physical Downlink Control Channel). In addition, when deactivation is instructed, the control section 655 may output a flag for instructing the temporary stopping of the measurement configuration together with the control signal. When activation is instructed, the control section 655 may output a flag for instructing the start of the measurement configuration together with the control signal. In this way, it is possible to temporarily stop the measurement of the component carrier which is not scheduled to be used.

In this embodiment, area information is transmitted from the base station 650 to the terminal 600. However, the terminal 600 may derive the area information from reception power. The area information is derived from the transmission power of the base station 650. In addition, the area information may be set such that the area sequentially increases from a high position or a low position in the frequency list. In this case, the same operation as described above can be performed.

(Modifications)

The wireless communication systems according to the embodiments of the invention have been described above, but the scope of the invention is not limited thereto. The invention can be changed or modified for purposes within the scope described in the claims.

For example, the first to fifth embodiments have been described above, but the scope of the invention is not limited thereto. The first to fifth embodiments may be combined with each other.

For example, when the fourth embodiment is combined with the fifth embodiment, the subject carrier monitoring mode section 415 according to the fourth embodiment may be changed to the subject carrier monitoring mode section 515 according to the fifth embodiment.

For example, when the first embodiment is combined with the fifth embodiment, the first report control section 103 may have the function of the subject carrier monitoring mode section 515 according to the fifth embodiment. In addition, for example, when the sixth embodiment is combined with the third embodiment, the deactivation monitoring section 616 and the area information management section 617 according to the sixth embodiment may be incorporated into the report control section 301 and the control section 307 according to the third embodiment.

The above-mentioned base station may be applied to a structure including a terminal, such as a relay node or a home eNB. In addition, the above-mentioned terminal may be applied to a structure connected to the base station, such as a relay node.

The mode determining section 313, 413, or 513 may determine that neither other carriers nor the subject carrier are monitored, according to the conditions of the component carrier which is being used. For example, when the number of component carriers which are being used is equal to or more than a natural number z, the mode determining section determines that neither other carriers nor the subject carrier are monitored. The natural number z may be indicated by signaling from the base station, may be uniquely determined by the capability (UE capability) of the terminal, or may be set to the terminal in advance. In this way, it is possible to reduce the number of measurements. In addition, when measurement configuration is performed from the base station, it is determined whether the terminal performs measurement on the basis of conditions. In this way, it is possible to reduce the number of times the base station transmits a measurement configuration signal.

The mode determining section 313, 413, or 513 may determine that neither other carriers nor the subject carrier are monitored, on the basis of the component carrier in which PLP occurs. For example, in the case of the extension carrier, the mode determining section determines that neither other carriers nor the subject carrier are monitored. In this way, it is possible to reduce the number of times the terminal performs measurement.

When the carrier transmitting the PDCCH of the extension carrier is deactivated, the extension carrier may be determined to be deactivated. In this way, it is possible to deactivate the monitoring of the carrier which cannot be received, without using a control signal. In addition, when PLP occurs in the extension carrier, it may be determined that the monitoring of the carrier is deactivated without a control signal from the base station and the finding of another carrier is not performed.

In addition, a flag indicating measurement corresponding to the capability (UE capability) of the terminal may be included in the measurement configuration. In this case, when the component carrier is configured to be measured, the terminal can explicitly know that measurement is performed without a measurement gap. When the terminal transmits the measurement report, a flag indicating that the terminal wants to perform the other-carrier monitoring mode may be included in the measurement report. In this way, the base station can transmit measurement configuration for the other-carrier monitoring mode to the terminal.

In each of the above-described embodiments, the terminal may have a function of deactivating the component carrier in which PLP occurs. When the transmission timing of signals from the terminal to the base station varies depending on the component carriers and the component carriers with the same transmission timing form a group, it is considered that the terminal manages the transmission timing for each group and stores a downlink reference component carrier (DL Reference CC) for managing the transmission timing for each group. In this case, when each group has PUCCH and PLP occurs in the downlink reference component carrier, ACK/NACK cannot be transmitted to any component carrier in the group and thus cannot be received by the downlink. Therefore, the terminal may have a function of deactivating the component carriers. When a plurality of groups have one PUCCH and PLP occurs in the downlink reference component carrier of the group having PUCCH, ACK/NACK cannot be transmitted in the plurality of groups and thus cannot be received by the downlink. Therefore, the terminal may have a function of deactivating the component carriers. In addition, the terminal may have a function of deleting the configuration instead of the deactivation function. As described above, when the component carrier which is monitored, but cannot be used is deactivated or the configuration is deleted, it is possible to reduce power consumption.

In each of the above-described embodiments, the invention is configured by hardware. However, the invention may be implemented by software.

Each functional block used to describe each of the embodiments is typically implemented by LSI, which is an integrated circuit. Each functional block is formed by one chip, or some or all of the functional blocks may be integrated into one chip. Here, LSI is used as the integrated circuit. However, there are integrated circuits called an IC, a system LSI, a super LSI, and an ultra LSI according to the degree of integration.

A method of forming an integrated circuit is not limited to LSI, but may be implemented by a dedicated circuit or a general-purpose processor. In addition, a FPGA (Field Programmable Gate Array) which is programmable after LSI is manufactured, or a reconfigurable processor which can reconfigure connection between circuit cells or the setting of the circuit cells in the LSI may be used.

When an integrated circuit technique replacing the LSI appears by the progress of the semiconductor technique or another technique derived from the semiconductor technique, the functional blocks may be integrated by the technique. For example, biotechnology may be applied.

The invention has been described in detail or with reference to specific embodiments, but it will be understood by those skilled in the art that various changes or modifications can be made without departing from the scope and spirit of the invention.

This application is based on Japanese Patent Application No. 2009-224655, filed on Sep. 29, 2009 and Japanese Patent Application No. 2010-003333, filed on Jan. 8, 2010, the contents of which are incorporated herein by reference.

INDUSTRIAL APPLICABILITY

The wireless communication apparatus, the wireless communication base station, and the wireless communication system according to the invention are useful as, for example, a device or a system which performs communication using component carriers of a plurality of communication cells at the same time by carrier aggregation.

REFERENCE SIGNS LIST

100, 200, 300, 400, 500, 600: WIRELESS COMMUNICATION TERMINAL
101: RECEIVING SECTION 103, 201, 301, 401, 501, 603: REPORT CONTROL SECTION
105, 307, 605: CONTROL SECTION
107: TRANSMITTING SECTION
111, 211, 311, 411, 511: RADIO CONDITION DETERMINING SECTION
113, 213, 613: REPORT CREATING SECTION
115, 215, 319, 419, 519: PLP DETERMINING SECTION
150, 350: WIRELESS COMMUNICATION BASE STATION
151: RECEIVING SECTION
153, 351: PLP DETERMINING SECTION
155, 655: CONTROL SECTION
157: TRANSMITTING SECTION
217: MEASUREMENT CONFIGURATION GENERATING SECTION
219: MONITORING CARRIER DETERMINING SECTION
303: CQI REPORT CREATING SECTION
305: MEASUREMENT REPORT CREATING SECTION
313, 413, 513: MODE DETERMINING SECTION
315, 415, 515: SUBJECT CARRIER MONITORING MODE SECTION
317, 417, 517: OTHER-CARRIER MONITORING MODE SECTION
421: MEASUREMENT CONFIGURATION GENERATING SECTION
423: MONITORING CARRIER DETERMINING SECTION
521: MONITORING PERIOD DETERMINING SECTION
616: DEACTIVATION MONITORING SECTION
617: AREA INFORMATION MANAGEMENT SECTION

The invention claimed is:

1. A wireless communication apparatus that can communicate with a wireless communication base station using component carriers of a plurality of communication cells managed by the wireless communication base station at the same time, comprising:
- a receiving section that receives a reference signal transmitted from the wireless communication base station in each of the communication cells;
- a radio condition determining section that determines a radio condition of the wireless communication apparatus on the basis of the reference signal received by the receiving section;
- a report creating section that creates a report to be transmitted to the wireless communication base station on the basis of the determination result of the radio condition determining section; and
- a transmitting section that transmits the report to the wireless communication base station,
- wherein the radio condition determining section includes a physical layer problem determining section which determines whether a physical layer problem occurs in each component carrier used or can be used in communication between the wireless communication apparatus and the wireless communication base station;
- wherein when the physical layer problem determining section determines that the physical layer problem occurs in some, but not all, of the plurality of component carriers used in the communication between the wireless communication apparatus and the wireless communication base station, based on a lack of synchronization with the wireless communication base station in said some of the plurality of component carriers, the radio condition determining section notifies the component carrier in which the physical layer problem occurs to the report creating section, and determines that radio link failure has not occurred;
- wherein when the physical layer problem determining section determines that the physical layer problem occurs in all of the plurality of component carriers used in the communication between the wireless communication apparatus and the wireless communication base station, based on a lack of synchronization with the wireless communication base station in all of the plurality of component carriers, the radio condition determining section determines that radio link failure has occurred; and
- wherein the report creating section creates a report corresponding to the component carrier in which the physical layer problem occurs and a predetermined criterion.

2. The wireless communication apparatus according to claim 1, wherein the report creating section includes:
- a monitoring carrier determining section which determines a component carrier which can be used instead of the component carrier in which the physical layer problem occurs; and
- a measurement configuration generating section which generates a measurement configuration for configuring the measurement of the reference signal in at least one of the plurality of communication cells managed by the wireless communication base station;
- wherein when there is the measurement configuration of the component carrier determined by the monitoring carrier determining section, the report creating section determines whether the component carrier can be used on the basis of a measurement result using the measurement configuration, when the component carrier can be used, the report creating section generates a report including the measurement result of the component carrier which can be used and the measurement result of the component carrier in which the physical layer problem occurs; and
- wherein when there is no measurement configuration of the component carrier determined by the monitoring carrier determining section, the report creating section instructs the measurement configuration generating section to generate the measurement configuration of the component carrier.

3. The wireless communication apparatus according to claim 1, wherein the report creating section includes:
- a monitoring determining section that, when the physical layer problem determining section determines that the physical layer problem occurs in said some of the plurality of component carriers used in the communication between the wireless communication apparatus and the wireless communication base station, determines whether to monitor the radio condition of the component carrier in which the physical layer problem occurs or to monitor the radio condition of a component carrier other than the component carrier in which the physical layer problem occurs;
- a subject carrier monitoring mode report creating section that, when the monitoring determining section determines to monitor the radio condition of the component carrier in which the physical layer problem occurs, creates a report in which the measurement result of the component carrier is omitted; and
- an other-carrier monitoring mode report creating section that, when the monitoring determining section determines to monitor the radio condition of the component carrier other than the component carrier in which the physical layer problem occurs, creates a report including the measurement result of the component carrier and the measurement result of the component carrier in which the physical layer problem occurs.

4. The wireless communication apparatus according to claim 1,
wherein the predetermined criterion is the capability of the wireless communication apparatus.

5. The wireless communication apparatus according to claim 3, wherein the other-carrier monitoring mode report creating section includes:
a monitoring carrier determining section which determines a component carrier which can be used instead of the component carrier in which the physical layer problem occurs; and
a measurement configuration generating section which generates a measurement configuration for configuring the measurement of the reference signal in at least one of the plurality of communication cells managed by the wireless communication base station,
wherein when there is the measurement configuration of the component carrier determined by the monitoring carrier determining section, the other-carrier monitoring mode report creating section determines whether the component carrier can be used on the basis of a measurement result using the measurement configuration, when the component carrier can be used, the other-carrier monitoring mode report creating section generates a report including the measurement result of the component carrier which can be used and the measurement result of the component carrier in which the physical layer problem occurs; and
wherein when there is no measurement configuration of the component carrier determined by the monitoring carrier determining section, the other-carrier monitoring mode report creating section instructs the measurement configuration generating section to generate the measurement configuration of the component carrier.

6. The wireless communication apparatus according to claim 3, wherein the subject carrier monitoring mode report creating section changes a reception period of the reference signal by the receiving section according to the radio condition of a reference component carrier among the plurality of component carriers.

7. The wireless communication apparatus according to claim 1, further comprising:
an area information management section that manages the size of the communication cell used by the wireless communication apparatus on the basis of information about the size of the communication cell which is transmitted from the wireless communication base station; and
a deactivation monitoring section that monitors at least one of the component carriers configured to measure the reference signal, among the component carriers which are notified to be deactivated by the wireless communication base station,
wherein, when there is a monitored component carrier and the monitored component carrier has an area smaller than that of the component carrier notified by the wireless communication base station, the deactivation monitoring section switches the component carrier to be monitored to the component carrier notified by the wireless communication base station.

8. The wireless communication apparatus according to claim 7, wherein, during the monitoring of the component carrier which is notified to be activated by the wireless communication base station, the deactivation monitoring section stops the monitoring when there is no other component carrier which is configured to be measured and is deactivated, and monitors a component carrier with an area size that is equal to or more than the area size of the component carrier which is being monitored when there is another component carrier which is configured to be measured and is deactivated.

9. A wireless communication system comprising:
a wireless communication base station; and
a wireless communication apparatus that can communicate with the wireless communication apparatus using component carriers of a plurality of communication cells managed by the wireless communication base station at the same time,
wherein the wireless communication apparatus includes:
a receiving section that receives a reference signal transmitted from the wireless communication base station in each of the communication cells;
a radio condition determining section that determines a radio condition of the wireless communication apparatus on the basis of the reference signal received by the receiving section;
a report creating section that creates a report to be transmitted to the wireless communication base station on the basis of the determination result of the radio condition determining section; and
a transmitting section that transmits the report to the wireless communication base station,
wherein the radio condition determining section includes a physical layer problem determining section that determines whether a physical layer problem occurs in each component carrier which is used or can be used in communication between the wireless communication apparatus and the wireless communication base station;
wherein when the physical layer problem determining section determines that the physical layer problem occurs in some, but not all, of the plurality of component carriers used in the communication between the wireless communication apparatus and the wireless communication base station, based on a lack of synchronization with the wireless communication base station in said some of the plurality of component carriers, the radio condition determining section notifies the component carrier in which the physical layer problem occurs to the report creating section, and determines that radio link failure has not occurred;
wherein when the physical layer problem determining section determines that the physical layer problem occurs in all of the plurality of component carriers used in the communication between the wireless communication apparatus and the wireless communication base station, based on a lack of synchronization with the wireless communication base station in all of the plurality of component carriers, the radio condition determining section determines that radio link failure has occurred;
wherein the report creating section creates a report corresponding to the component carrier in which the physical layer problem occurs and a predetermined criterion; and
wherein the wireless communication base station includes:
a receiving section that receives the report transmitted from the wireless communication apparatus;
a physical layer problem determining section that determines whether the physical layer problem occurs in said some of the plurality of component carriers used in the communication between the wireless communication apparatus and the wireless communication base station on the basis of the report;

a control section that temporarily stops the allocation of radio resources to the component carrier in which the physical layer problem occurs when the determination result of the physical layer problem determining section indicates that the physical layer problem occurs in said some of the plurality of component carriers; and a transmitting section that transmits the reference signal to the wireless communication apparatus.

* * * * *